US009497637B2

(12) United States Patent
Ruuska et al.

(10) Patent No.: US 9,497,637 B2
(45) Date of Patent: Nov. 15, 2016

(54) METHOD, APPARATUS, AND COMPUTER PROGRAM PRODUCT FOR LINK SPECIFIC PARAMETERS BASED ON EMISSION CHARACTERISTICS OF DEVICE

(75) Inventors: Päivi Ruuska, Kristiansand (NO); Jari Junell, Espoo (FI); Antti Piipponen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 8 days.

(21) Appl. No.: 14/364,284

(22) PCT Filed: Dec. 19, 2011

(86) PCT No.: PCT/IB2011/055794
§ 371 (c)(1),
(2), (4) Date: Oct. 7, 2014

(87) PCT Pub. No.: WO2013/093551
PCT Pub. Date: Jun. 27, 2013

(65) Prior Publication Data
US 2015/0111596 A1    Apr. 23, 2015

(51) Int. Cl.
*H04W 16/14* (2009.01)
*H04W 28/18* (2009.01)
*H04L 27/00* (2006.01)
(Continued)

(52) U.S. Cl.
CPC ............ *H04W 16/14* (2013.01); *H04L 5/0066* (2013.01); *H04L 5/0091* (2013.01); *H04L 27/0006* (2013.01); *H04W 28/18* (2013.01); *H04W 52/367* (2013.01)

(58) Field of Classification Search
CPC ............................. H04W 16/14; H04W 28/18
USPC ........................................ 455/454; 370/224
See application file for complete search history.

(56) References Cited

U.S. PATENT DOCUMENTS

2011/0080882 A1    4/2011  Shu et al.
2011/0305206 A1   12/2011  Junell et al.

OTHER PUBLICATIONS

ETSI TR 103 067 V0.0.7 (Nov. 2011) Reconfigurable Radiop Systems (RRS); Feasibility Study on Radio Frequency (RF) Performanace for Cognitive Radio Systems Operating on UHF TV Band White Spaces.*

(Continued)

*Primary Examiner* — Kamran Afshar
*Assistant Examiner* — Ather Mohiuddin
(74) *Attorney, Agent, or Firm* — Locke Lord LLP

(57) ABSTRACT

Method, apparatus, and computer program product embodiments are disclosed for efficient radio spectrum use, for example in TV white spaces and radio coexistence, wherein link parameters are selected based on the available spectrum and radio device characteristics and capabilities. An example embodiment includes a method of receiving, in a first white space device, information relating to allowed emission levels (25) in a white space radio system; receiving by the first white space device, information relating to emission characteristics (10) of a second white space device or at least one slave white space device, received from the second white space device; computing by the first white space device, one or more allowed operating parameters (12) for the second white space device or the at least one slave white space device, based on the received information relating to allowed emission levels (25) and the received emission characteristics (10); and transmitting at least one of the allowed operating parameters (12) to the second white space device.

24 Claims, 17 Drawing Sheets

(51) Int. Cl.
  *H04L 5/00* (2006.01)
  *H04W 52/36* (2009.01)

(56) References Cited

OTHER PUBLICATIONS

Extended European Search Report for dated Dec. 3, 2015 for European Application No. 11877931.3-1505, 9 pages.

"ECC Report 159, Technical and Operational Requirements for the Possible Operation of Cognitive Radio Systems in the 'White Spaces' of the Frequency Band 470-790 MHz", Cardiff, Jan. 2011, 163 pages.

International Search Report received for corresponding Patent Cooperation Treaty Application No. PCT/IB2011/055794, dated Sep. 18, 2012, 6 pages.

Reconfigurable radio systesm (RRS); feasibility study on radio frequency (RF) performances for cognitive radio systems operating in UHF TV band white spaces. ETSI Technical Report. ETSI Draft; RRSWG1(11)_Draft_TR_103_067_V0007; pp. 1-53.

Ecclesine P. et al. OFCOM ECC TR 159 TVWS terminology IEEE Mentor, IEEE Standards Association, IEEE 802.11 WLAN WG [online].Nov. 1, 2011, 12 pages. Retrieved from the Internet: <https://mentor.ieee.org/802.11/documents>.

\* cited by examiner

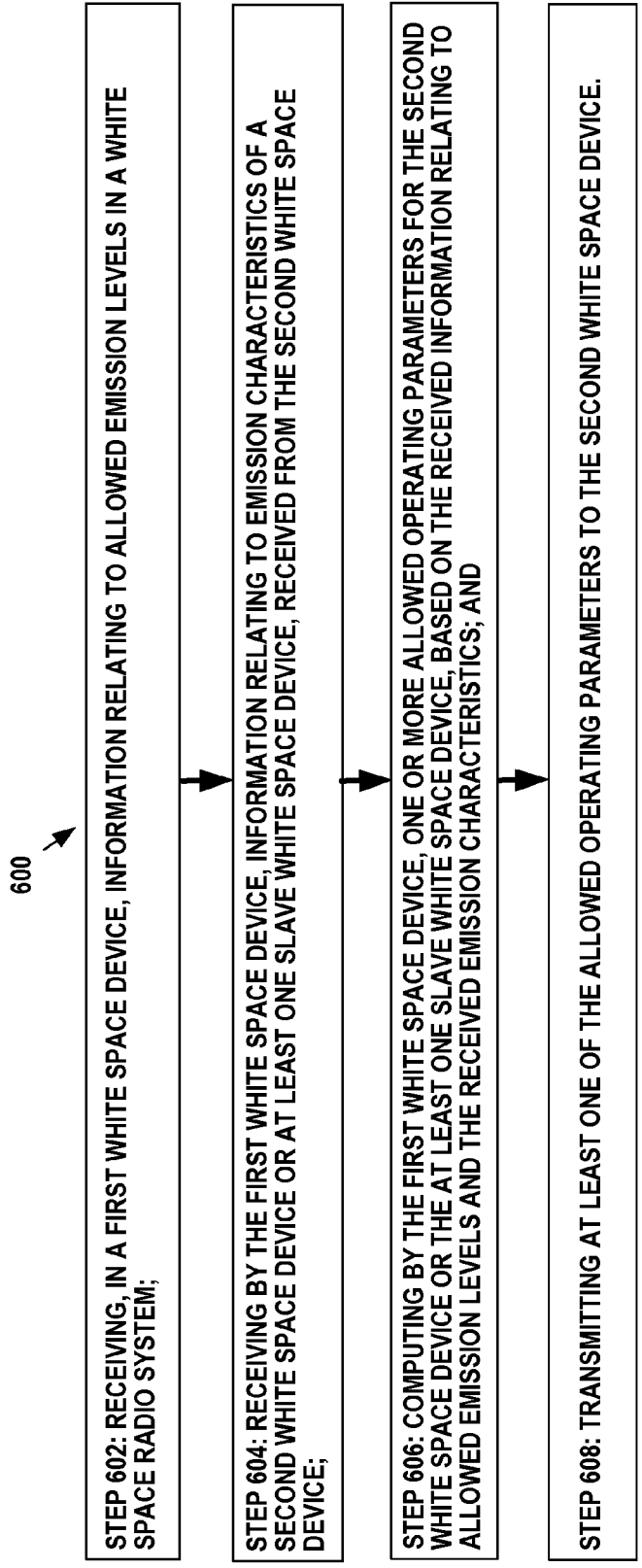

FIG. 6B

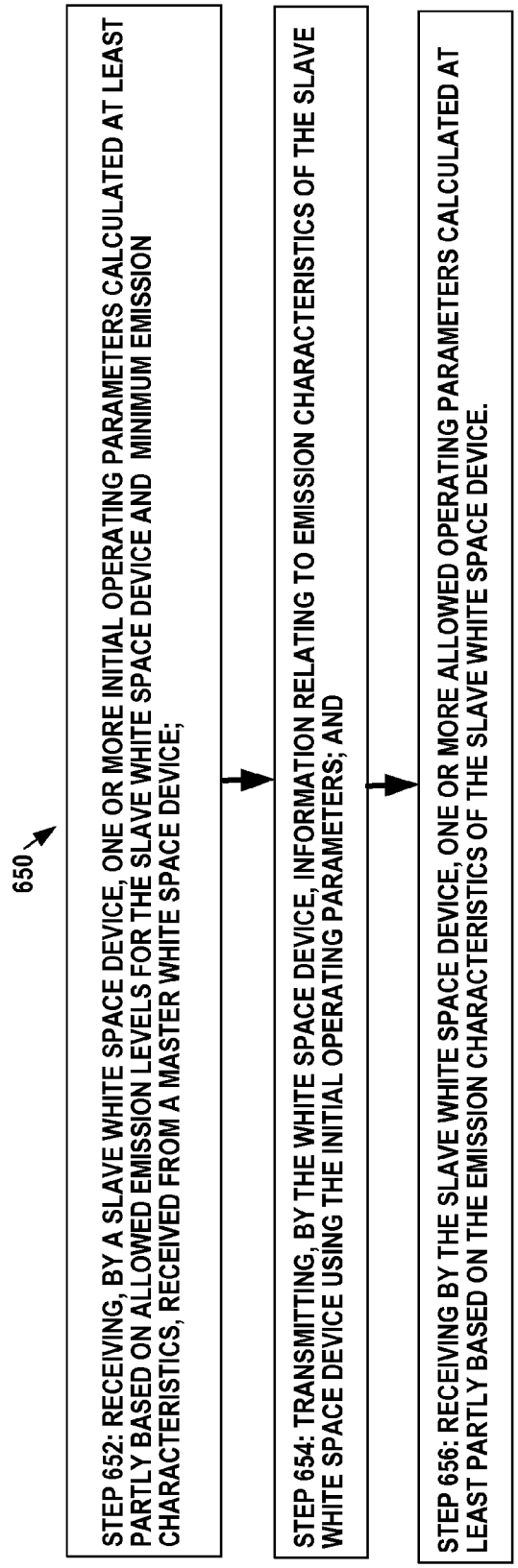

650

STEP 652: RECEIVING, BY A SLAVE WHITE SPACE DEVICE, ONE OR MORE INITIAL OPERATING PARAMETERS CALCULATED AT LEAST PARTLY BASED ON ALLOWED EMISSION LEVELS FOR THE SLAVE WHITE SPACE DEVICE AND MINIMUM EMISSION CHARACTERISTICS, RECEIVED FROM A MASTER WHITE SPACE DEVICE;

STEP 654: TRANSMITTING, BY THE WHITE SPACE DEVICE, INFORMATION RELATING TO EMISSION CHARACTERISTICS OF THE SLAVE WHITE SPACE DEVICE USING THE INITIAL OPERATING PARAMETERS; AND

STEP 656: RECEIVING BY THE SLAVE WHITE SPACE DEVICE, ONE OR MORE ALLOWED OPERATING PARAMETERS CALCULATED AT LEAST PARTLY BASED ON THE EMISSION CHARACTERISTICS OF THE SLAVE WHITE SPACE DEVICE.

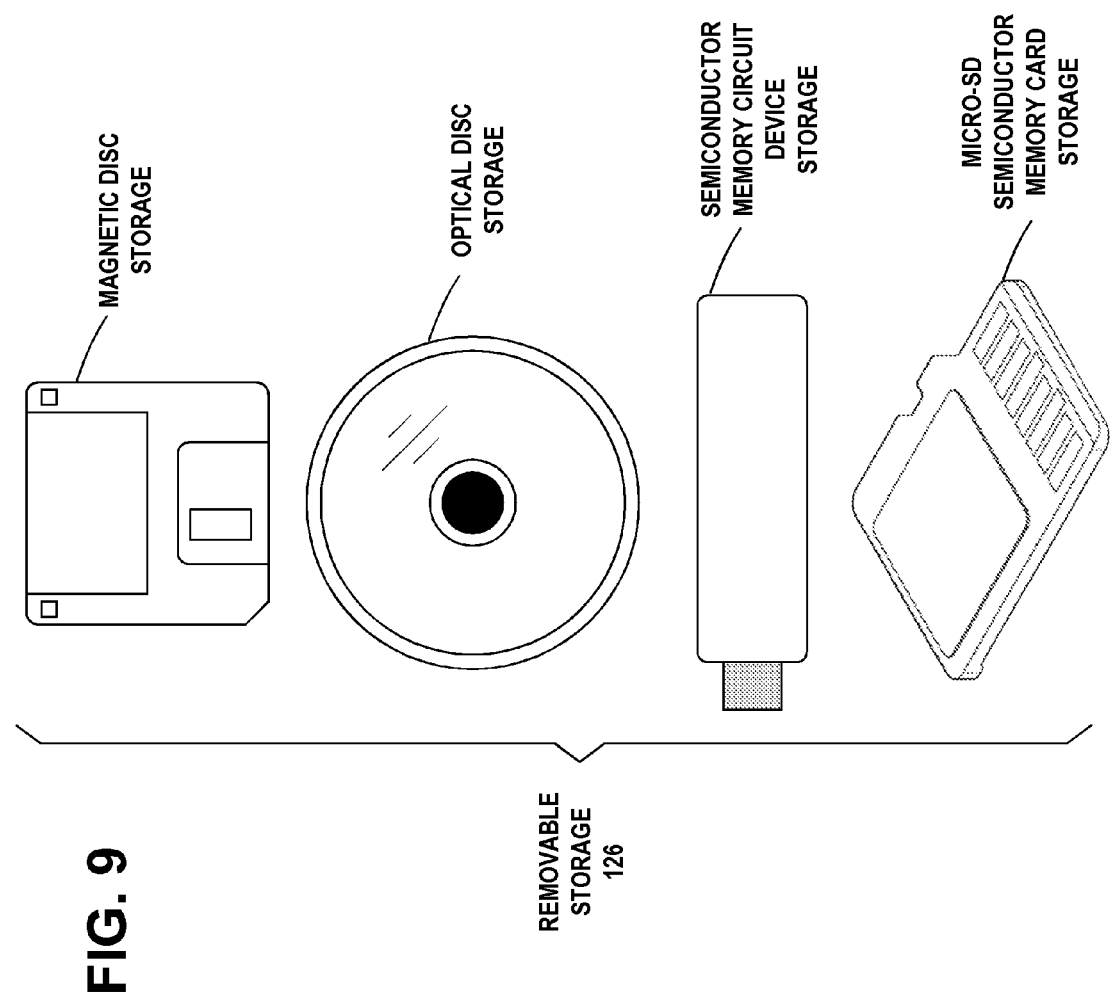

METHOD, APPARATUS, AND COMPUTER PROGRAM PRODUCT FOR LINK SPECIFIC PARAMETERS BASED ON EMISSION CHARACTERISTICS OF DEVICE

RELATED APPLICATION

This application was originally filed as PCT Application No. PCT/IB2011/055794 filed Dec. 19, 2011.

FIELD

The field of the invention relates to efficient radio spectrum use, for example in TV white spaces and radio coexistence, wherein link parameters are selected based on the available spectrum and radio device characteristics and capabilities.

BACKGROUND

Use of radio frequency bands of the electromagnetic spectrum is regulated by governments in most countries, by allocating specific frequency bands to particular types of uses, such as licensed bands for commercial radio and television broadcasting, cellular telephony, mobile networks such as CDMA2000, WCDMA, HSPA, LTE, and IMT, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. Unassigned or un-used frequencies also appear locally inside the frequency bands, which are otherwise allocated in other locations. The unassigned frequency bands and guard bands are referred to as white spaces.

TV white space may be broadly defined as broadcast television spectrum that is unused by licensed services. There are at least two categories of TV white space: [1] Dedicated TV white space is a portion of the spectrum that the FCC has reallocated to unlicensed use from previously analog broadcast usage, and [2] Locally unused spectrum by licensed TV broadcasters in a geographic area.

[1] Dedicated TV white space: In the United States, the FCC has dedicated approximately 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

[2] Locally unused spectrum by licensed TV broadcasters: The FCC has adopted rules to allow unlicensed radio transmitters to operate in the broadcast television spectrum at locations where that spectrum is not being used by licensed broadcasters. The FCC proposes two mechanisms to enable the unlicensed transmitter to discover the available channels: geo-location and database based approach, and spectrum sensing. The use of one of the mechanisms is required for the unlicensed transmitter. The FCC proposed the use of geolocation to establish the location of the unlicensed transmitter and a database of TV bands use by licensed broadcasters organized by their geographic coverage areas, to enable the unlicensed transmitter to know where local TV band white spaces may be available. The FCC proposed the use of spectrum sensors in the unlicensed transmitter to detect the presence of the incumbent, primary TV broadcaster's signal in the local TV band to enable the unlicensed transmitter to immediately relinquish using the band. A primary user in such a local TV band would be an incumbent TV broadcaster licensed to operate in that band, but in those geographic areas where there are no licensed incumbent TV broadcasters in operation, other unlicensed secondary users may make use of that band. There may be also other incumbent users in the TV band, which the secondary users should avoid, such as program making and special events (PMSE) systems.

In addition to the United States, other countries are also considering to enable unlicensed, secondary operation in TV band white spaces. The requirements may slightly differ in different countries, e.g. in the United States the maximum transmit power for unlicensed device is defined based on the device type, whereas in Europe location specific maximum transmission power has been considered. In that case the maximum allowed transmission power for an unlicensed device would depend on the device geo-location, i.e. the distance from the primary users. The device characteristics, such as emission mask/ACLR (adjacent channel leakage ratio) may affect the maximum allowed transmission power.

Other RF spectrum white spaces may be defined as RF spectrum that is locally unused in certain geographic areas, such as for example frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band. Further, other schemes of secondary use of spectrum, other than unlicensed schemes may exist, such as licensing, regulator defined policies, cognitive principles, or authorized shared access.

SUMMARY

Method, apparatus, and computer program product embodiments are disclosed to for efficient radio spectrum use, for example in TV white spaces and radio coexistence, wherein link parameters are selected based on the available spectrum and radio device characteristics and capabilities.

In example embodiments of the invention, an emission level is the maximum allowed intentional or unintentional power level that may be generated by a transmitter at a defined frequency. Emission characteristics of a transmitter are the transmission power at a characteristic bandwidth and the related unintentionally transmitted power around the characteristic bandwidth.

Example embodiments of the invention include a method comprising:

receiving, in a first white space device, information relating to allowed emission levels in a white space radio system;

receiving by the first white space device, information relating to emission characteristics of a second white space device or at least one slave white space device, received from the second white space device;

computing by the first white space device, one or more allowed operating parameters for the second white space device or the at least one slave white space device, based on the received information relating to allowed emission levels and the received emission characteristics; and transmitting at least one of the allowed operating parameters to the second white space device.

Example embodiments of the invention include the method comprising:

wherein the at least one slave white space device is associated with the second white space device.

Example embodiments of the invention include the method comprising:

transmitting a beacon message to the slave white space device, including at least one of information about the master white space device, information relating to the allowed emission levels in the white space radio system, initial operating parameters, emission characteristics of the master white space device, minimum allowed emission characteristics to define the initial operating parameters.

Example embodiments of the invention include the method comprising:

wherein the first white space device comprises a master white space device and the second white space device comprises the at least one slave white space device.

Example embodiments of the invention include the method comprising:

wherein the first white space device comprises a geo-location database and the second white space device comprises a master white space device Example embodiments of the invention include the method comprising:

receiving by the master white space device, a request from the at least one slave white space device for modified operating parameters.

Example embodiments of the invention include the method comprising:

wherein minimum allowed emission characteristics are received from a geo-location database; and initially communicating by the master white space device with the at least one slave white space device using the minimum allowed emission characteristics.

Example embodiments of the invention include an apparatus comprising:

at least one processor;

at least one memory including computer program code;

the at least one memory and the computer program code configured to, with the at least one processor, cause the apparatus at least to:

receive information relating to allowed emission levels in a white space radio system;

receive information relating to emission characteristics of a white space device or at least one slave white space device;

compute one or more allowed operating parameters for the white space device or the at least one slave white space device, based on the received information relating to allowed emission levels and the received emission characteristics of the white space device or the at least one slave white space device; and transmit at least one of the allowed operating parameters to the white space device.

Example embodiments of the invention include the apparatus comprising:

wherein the at least one slave white space device is associated with the second white space device.

Example embodiments of the invention include the apparatus comprising:

the at least one memory and the computer program code configured to, with the at least one processor, cause the apparatus at least to:

transmit in a beacon message to the slave white space device, including at least one of information about the master white space device, information relating to the allowed emission levels in the white space radio system, initial operating parameters, emission characteristics of the master white space device, minimum allowed emission characteristics to define the initial operating parameters.

Example embodiments of the invention include the apparatus comprising:

wherein the apparatus comprises a master white space device and the white space device comprises the at least one slave white space devices.

Example embodiments of the invention include the apparatus comprising:

wherein the apparatus comprises a geo-location database and the white space device comprises a master white space device.

Example embodiments of the invention include the apparatus comprising:

the at least one memory and the computer program code configured to, with the at least one processor, cause the apparatus at least to:

receive a request from the at least one slave white space device for modified operating parameters.

Example embodiments of the invention include the apparatus comprising:

wherein minimum allowed emission characteristics are received from a geo-location database; and wherein the at least one memory and the computer program code are configured to, with the at least one processor, cause the apparatus at least to:

initially communicate with the at least one slave white space device, using the minimum allowed emission characteristics.

Example embodiments of the invention include a method comprising:

receiving, by a slave white space device, one or more initial operating parameters calculated at least partly based on allowed emission levels for the slave white space device and minimum emission characteristics, received from a master white space device;

transmitting, by the slave white space device, information relating to emission characteristics of the slave white space device using the initial operating parameters; and receiving by the slave white space device, one or more allowed operating parameters calculated at least partly based on the emission characteristics of the slave white space device.

Example embodiments of the invention include the method comprising:

wherein the slave white space device is associated with the master white space device.

Example embodiments of the invention include the method comprising:

receiving a beacon message from the master white space device, including at least one of information about the master white space device, information relating to the allowed emission levels, the one or more initial operating parameters, or the minimum emission characteristics.

Example embodiments of the invention include the method comprising:

wherein the slave white space device is associated with the master white space device, and the information relating to the emission characteristics of the slave white space device is sent to the master white space device;

the method further comprising:

communicating with the master white space device using the received allowed operating parameters.

Example embodiments of the invention include the method comprising:

wherein the emission characteristics of the slave white space device are determined based on one or more operating parameters of the slave white space device.

Example embodiments of the invention include the method comprising:

wherein the one or more operating parameters comprise at least one of transmit power and transmit frequency.

Example embodiments of the invention include an apparatus comprising:

at least one processor;

at least one memory including computer program code;

the at least one memory and the computer program code configured to, with the at least one processor, cause the apparatus at least to:

receive one or more initial operating parameters calculated at least partly based on allowed emission levels for the apparatus and minimum emission characteristics;

transmit information relating to emission characteristics of the apparatus using the initial operating parameters; and receiving one or more allowed operating parameters calculated at least partly based on the emission characteristics of the apparatus.

Example embodiments of the invention include the apparatus comprising:

wherein the apparatus is associated with a master white space device, and the information relating to the emission characteristics of the apparatus is sent to the master white space device;

the at least one memory and the computer program code further configured to:

communicate with the master white space device using the received allowed operating parameters.

Example embodiments of the invention include the apparatus comprising:

wherein the emission characteristics of the apparatus are determined based on one or more operating parameters of the apparatus.

Example embodiments of the invention include the apparatus comprising:

wherein the one or more operating parameters comprise at least one of transmit power and transmit frequency.

Example embodiments of the invention include a computer program product comprising computer executable program code recorded on a computer readable, non-transitory storage medium, the computer executable program code comprising:

code for receiving, in a first white space device, information relating to allowed emission levels in a white space radio system;

code for receiving by the first white space device, information relating to emission characteristics of a second white space device or at least one slave white space device, received from the second white space device;

code for computing by the first white space device, one or more allowed operating parameters for the second white space device or the at least one slave white space device, based on the received information relating to allowed emission levels and the received emission characteristics; and code for transmitting the allowed operating parameters to the second white space device.

Example embodiments of the invention include the computer program product, further comprising:

wherein the at least one slave white space device is associated with the second white space device.

Example embodiments of the invention include the computer program product of claim 25, further comprising:

code for transmitting in a beacon message to the second white space device, including at least one of information about the first white space device, information relating to the allowed emission levels in the white space radio system, initial operating parameters, or minimum emission characteristics specified in radio standard.

Example embodiments of the invention include a computer program product comprising computer executable program code recorded on a computer readable, non-transitory storage medium, the computer executable program code comprising:

code for receiving, by a slave white space device, one or more initial operating parameters calculated at least partly based allowed emission levels for the slave white space device and minimum emission characteristics;

code for transmitting information relating to emission characteristics of the slave white space device using the initial operating parameters; and code for receiving one or more allowed operating parameters calculated at least partly based on the emission characteristics of the slave white space device.

The embodiments of the invention efficient radio spectrum use, for example in TV white spaces and radio coexistence, wherein link parameters are selected based on the available spectrum and radio device characteristics and capabilities.

DESCRIPTION OF THE FIGURES

FIG. 6A is an example flow diagram of operational steps in the master WSD receiving from the geo-location database, the allowed emission levels at its geo-location in response to its query, receiving the emission characteristics from its associated slave WSD, computing allowed operating parameters for the slave WSD, and transmitting the allowed operating parameters to the slave WSD, according to an embodiment of the present invention.

FIG. 6B is an example flow diagram of operational steps in the slave WSD receiving the allowed operating parameters from the master WSD, comparing the allowed operating parameters with the capabilities and requirements of the slave WSD, and requesting new allowed operating parameters, according to an embodiment of the present invention.

FIG. 9 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

DISCUSSION OF EXAMPLE EMBODIMENTS OF THE INVENTION

Figure 1A:
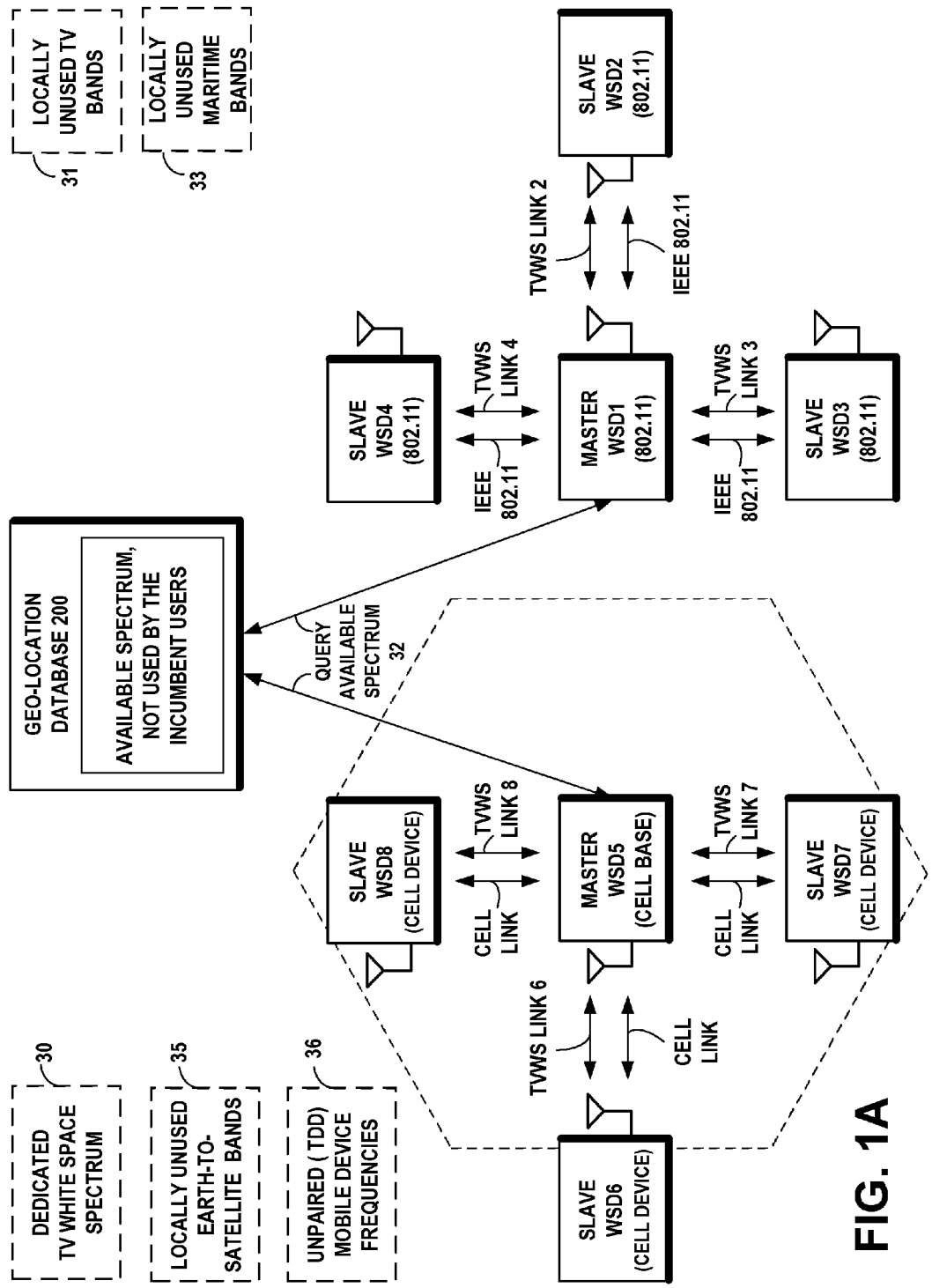
FIG. 1A is a system architecture diagram according to an example embodiment of the invention, illustrating enabling white space device (WSD) operation in the white space spectrum, wherein a master WSD queries the available spectrum from a geo-location database, and the returned information enables the operation of both the master WSD and its associated slave WSDs in the master WSD's operation area. Also shown is a second WSD device and its associated slave WSDs in the second master WSD's operation area, in an example embodiment of the invention.

In the United States, the FCC has opened up 300 MHz to 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used.

The FCC has defined the regulation of white spaces in *Second Memorandum Opinion and Order*, FCC 10-174, Sep. 23, 2010 for secondary white space devices (WSD). In Europe, the European Conference of Postal and Telecommunications Administrations (CEPT) has defined initial requirements in ECC Report 159: *Technical and Opera-*

*tional Requirements for the Possible Operation of Cognitive Radio Systems in the 'White Spaces' of the Frequency Band 470-790 MHz*, January 2011.

Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

Coexistence standards are currently being developed to enable two or more independently operated wireless networks or devices using any radio technologies adapted for TV white space frequency bands, to access the same TV white space frequency band in the same location without mutual interference.

The IEEE 802.19 Working Group is currently defining coexistence rules for heterogeneous secondary networks. An example embodiment of the invention enables coexistence between heterogeneous secondary networks and coexistence between secondary networks and primary networks that are required to be protected. Primary networks and users are incumbent users of the selected frequency band that have a form of priority access to the band. Primary networks include networks operating in FCC licensed bands, such as for commercial radio and television broadcasting. Secondary networks and users are allowed to use the selected band only if there are resources that are not used by the primary users. Secondary networks include any broadband networks operating unlicensed in the TV white spaces (TVWS) and using transmission devices that comply with the FCC requirements for TV Band Devices (TVBDs). Fixed TVBD devices must include geo-location and query a database to determine allowed channels. Portable master TVBD devices must be able to access geo-location data or include a spectrum sensing capability to identify TV and wireless microphone signals.

The FCC has adopted rules to allow unlicensed radio transmitters to operate in the broadcast television spectrum at locations where that spectrum is not being used by licensed broadcasters. The FCC required the use of geo location to establish the location of the unlicensed transmitter and a database of TV bands use by licensed broadcasters organized by their geographic coverage areas, to enable the unlicensed transmitter to know where local TV band white spaces may be available. Alternatively, the FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Active coexistence between secondary networks using the RF white spaces may require new techniques for fairly sharing the available bandwidth among different heterogeneous secondary networks and accord the required preference for primary users of the band. Such new techniques may require some form of communication between the secondary networks to enable a fair usage of the local spectrum.

In the United States, the WSD may operate as a master WSD of a network of associated slave WSD devices. For example, the master WSD may be an access point or base station. The master WSD is expected to access the geo-location database (DB) on behalf of its slave WSD devices, to discover the available spectrum that is not used by the incumbent users, for example, TV broadcasters.

FIG. 1A is an example system architecture diagram according to an example embodiment of the invention, illustrating enabling white space device (WSD) operation in the white space spectrum. Example white space spectrum in the operating area of a WSD device include dedicated TV white space spectrum 30, locally unused TV bands 31, locally unused maritime bands 33, locally unused satellite bands 35, and locally unpaired (TDD) mobile device frequencies. A master WSD, such as WSD1, is shown sending queries for the available spectrum to a geo-location database 200. Database 200 may comprise some internal structure, for example, in form functional blocks such as processors, memory, software/hardware modules, and the like, for performing operations described herein. Such blocks may for example transmit and receive information such as spectrum information, emission characteristics, and/or allowed operating parameters. The master WSD1 uses the IEEE 802.11 wireless LAN (WLAN) protocol for is normal communications on its IEEE 802.11 links, but it is capable of communicating in white space spectrum on TVWS links 2, 3, and 4. The returned information from the geo-location database 200 enables the operation in the white space spectrum, of both the master WSD1 and its associated slave WSDs, WSD2, WSD3, and WSD4 that are within the master WSD1's operational area. There may be other reasons to use TVWS, such as better propagation. Normal communication medium typically is available for WLAN (e.g. 2.4 or 5 GHz), but TVWS may not be available everywhere due primary users.

FIG. 1A also shows three non-limiting example white space spectra locally unused by licensed primary users of their respective spectrum white spaces, which may be used by the master WSD1 or slave WSD2, operating as unlicensed secondary users. TV band white space 31 is locally unused by licensed TV broadcasters. Maritime radio band 33 is locally unused by licensed maritime band radios. Earth station-to-satellite radio band 35 is locally unused by licensed earth station radios. A non-limiting example of a TV band white space 31 locally unused by licensed TV broadcasters is the 174-204 MHz band, representing the local absence of broadcast VHF TV channels 7, 8, 9, 10, and 11. If there were a local absence of licensed broadcasters in TV band white space 31, on VHF TV channels 7, 8, 9, 10, and 11, which would otherwise interfere with the master WSD1 or slave WSD2, then they could operate as unlicensed secondary users and make use of TV band white space 31. If either master WSD1 or slave WSD2 were to detect a signal transmitted from a neighboring TV broadcaster in band 31, then they would have to relinquish their use of the TV band white space 31 and make a resource request, in accordance with an example embodiment of the invention. Non-limiting examples of white space spectra are available in many parts of the electromagnetic spectrum. For example, white space spectra are available for personal/portable devices in the UHF portion of the spectrum.

A maritime radio operates in a number of licensed frequency allocations and is a primary user in the maritime radio band 33. If there were no licensed maritime radios in operation that would interfere with the master WSD1 or slave WSD2, then they could operate as unlicensed secondary users and make use of maritime radio band 33. If either master WSD1 or slave WSD2 were to detect a signal transmitted from a neighboring maritime radio, then they would have to relinquish their use of the maritime band 33 and make a resource request, in accordance with example embodiments of the invention.

A satellite earth station transmits to satellites in licensed frequency allocations from 2.025 GHz to 2.110 GHz and is a primary user in the earth-to-satellite band 35. If there were no licensed earth station radios in operation that would interfere with the master WSD1 or slave WSD2, then they could operate as unlicensed secondary users and make use of earth-to-satellite radio band 35. If either master WSD1 or slave WSD2 were to detect a signal transmitted from a neighboring earth station radio, then they would have to relinquish their use of the earth-to-satellite band 35 and make a resource request, in accordance with example embodiments of the invention.

Figure 7:
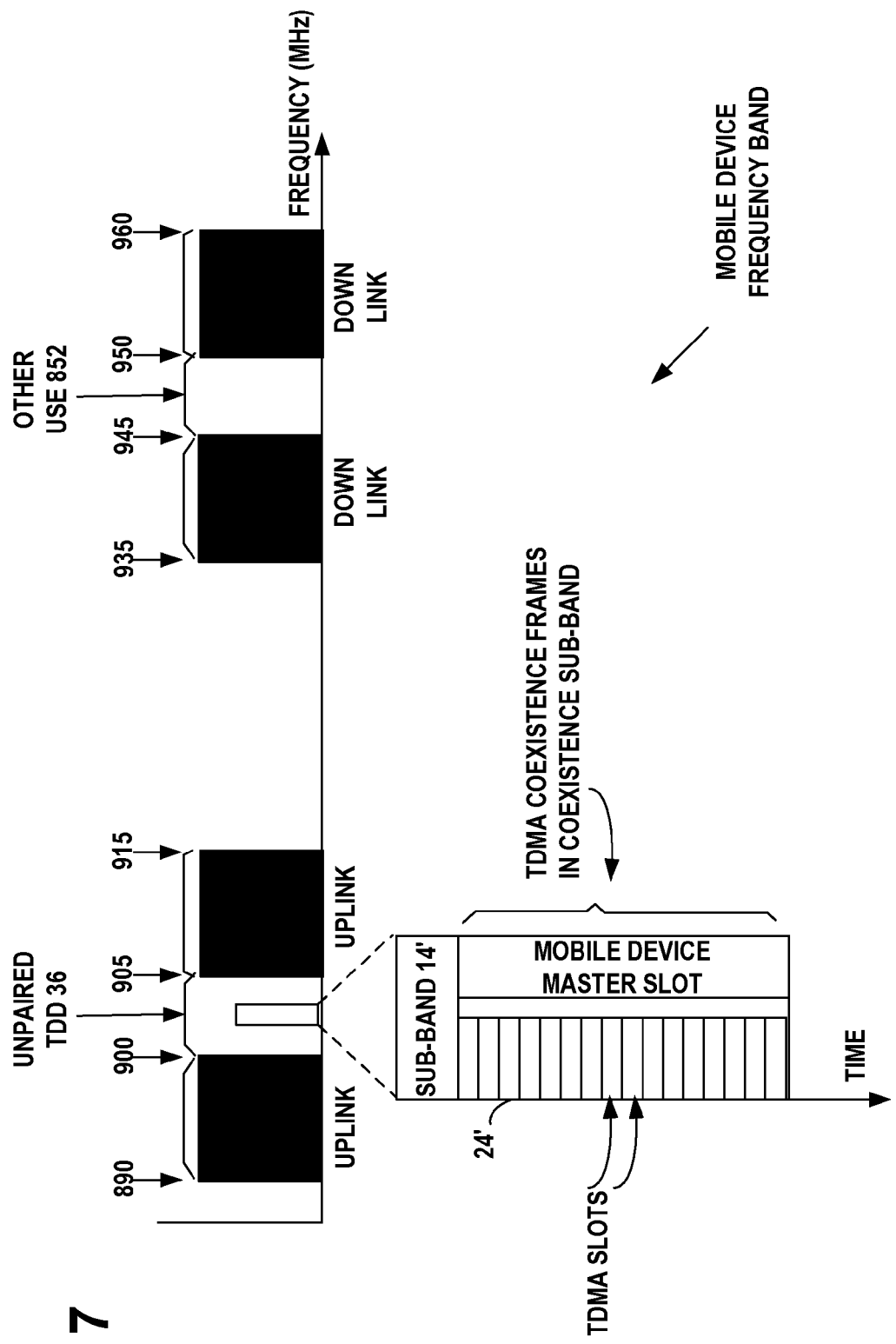
FIG. 7 is an example frequency band diagram illustrating an example TDMA coexistence frame 24' in sub-band 14' in an unpaired time domain duplex frequency white space of 900 to 905 MHz in the uplink portion of a mobile device communications frequency band, according to an example embodiment of the invention.

Also shown in FIG. 1A is a second master WSD device WSD5 and its associated slave WSDs WSD6, WSD7, and WSD8 in the second master WSD5's operation area. The master WSD5 uses a cellular 3rd Generation Partnership Project (3GPP) standard, such as Third-Generation (3G), Wideband Code Division Multiple Access (W-CDMA), High Speed Packet Access (HSPA), Long Term Evolution (LTE), LTE Advanced (LTE-A), or International Mobile Telecommunications Advanced (IMT-A), for its normal communications on the cell links, but it is capable of communicating in white space spectrum on TVWS links 6, 7, and 8. The returned information from the geo-location database enables the operation in the white space spectrum, of both the master WSD5 and its associated slave WSDs, WSD6, WSD7, and WSD8 that are within the master WSD5's operational area. FIG. 7 shows an example TDMA coexistence frame 24' in sub-band 14' in the unpaired time domain duplex frequency white space 36 in the uplink portion of the mobile device frequency band, which may be used by the cell base master device WSD5 and the cell slave devices WSD6, WSD7, and WSD8 in FIG. 1A. TVWS may be used, for examine, in carrier aggregation, where it is available, in addition to licensed media.

Similar examples include local area technologies implemented for example, cellular technologies for small cell operations such as hotspots, pico cells, femto cells, home nodes such as Home Node B (HNB), Home eNodeB (HeNB) and the like. Further, integrated local nodes of secondary networks may consist of 3GPP technologies combined with the IEEE technologies, for example LTE Home eNodeB (LTE HeNB) with Wi-Fi.

In accordance with an embodiment of the invention, the master WSD1, for example, receives from the geo-location database 200, the allowed emission levels at its geo-location in response to its query. In example embodiments of the invention, an emission level is the maximum allowed intentional or unintentional power level that may be generated by a transmitter at a defined frequency. The master device WSD1 also receives emission characteristics from its associated slave WSD, for example slave WSD2. In an example embodiment of the invention, the emission characteristics of slave WSD2 may be its transmission power at a characteristic bandwidth and the related unintentionally transmitted power around the characteristic bandwidth. The device may also be able to change its transmission power. The master device WSD1 then computes allowed operating parameters for the slave WSD2 and transmits the allowed operating parameters to the slave WSD2. The master may provide only the operating parameters which it proposes slave WSD2 to use, or a set of allowed operating parameters which the slave WSD2 may be allowed to use. In accordance with an embodiment of the invention, the slave WSD2 receives the allowed operating parameters from the master WSD and compares it with its own capabilities and the requirements it has for the white space channels. If the slave WSD device WSD2 determines that it requires more white space resources than are represented by the allowed operating parameters, the slave WSD2 may send a request to the master WSD1 to request new allowed operating parameters. The master device WSD1 may then compute new allowed operating parameters for the slave device WSD2, if they are available and appropriate.

In accordance with an embodiment of the invention, the allowed operating parameters may include a white space emission mask for slave WSD2, which is the allowed transmission power at a characteristic bandwidth, as a function of frequency, maintained within the limits of the emission level requirement when using the emission characteristics of slave WSD2.

In accordance with an embodiment of the invention, FIG. 1A shows the query 32 communicated by the master WSD1 to the geo-location database 200, which may include the following.

[1] The query may include the current position of the WSD, expressed in terms of geographical coordinates as determined by means of a geo-location method.

[2] The query may include the location accuracy of the geographical position of the WSD.

[3] The query may include the device type of the WSD, such as the device class. This may allow information to be returned according to device capabilities and interference characteristics. The geo-location database may then take into account the WSD's known transmission parameters in returning appropriate frequencies and allowed maximum transmission power. Different classes of devices, with different technical characteristics, may exhibit different interference characteristics (for example, antenna type, antenna height, type of technology and modulation) allowing different effective isotropic radiated power (EIRP) limits. For example, device classes that may have good out-of-band emission characteristics may be able to transmit with higher power levels on some frequencies and/or locations. In example embodiments of the invention, the WSD that queries the database may also provide the slave WSD with technical characteristics.

[4] The query may include the device ID/model that may be important, for example, in tracing reports of interferences and to potentially exclude certain devices/models.

The geo-location database 200 may return information to the inquiring WSD1, which may include the following.

[1] The geo-location database 200 may return available frequencies that may be used within the WSD device's location. Frequency information may be based on a particular bandwidth or alternatively may be provided as a start and end frequency. The frequency availability will be valid across an area comprising of one or more pixels, where a pixel may be defined as a square of pre-determined dimension, for example, 100 m×100 m. WSDs that move outside the current pixel or set of pixels (including a certain safety radius taking into account location uncertainty), within which they know they are allowed to transmit, may re-consult the geo-location database to get information about their new location before they transmit again.

[2] The geo-location database 200 may return the maximum transmit power for each WSD location, device class and channel assignment.

[3] The geo-location database 200 may return the appropriate national/regional database to consult.

[4] The geo-location database 200 may return the time of validity of the information provided, which defines the interval during which the available frequencies and the associated emission limits may be used without re-consultation by the WSD in its location or in the area the WSD addressed in its query. If the WSD needs available frequencies after the end of the validity time, or if it moves, it may re-consult the database.

[5] The geo-location database 200 may return information that flags the need of sensing in conjunction with the geo-location at a given frequency.

In example embodiments of the invention, the geo-location database may return the allowed emission levels that are same for all devices. A device merely needs to take care that it does not exceed the limits anywhere. The master WSD may calculate the maximum transmit power it can use based on its own emission characteristics, and its slave emission characteristics.

Figure 1B:
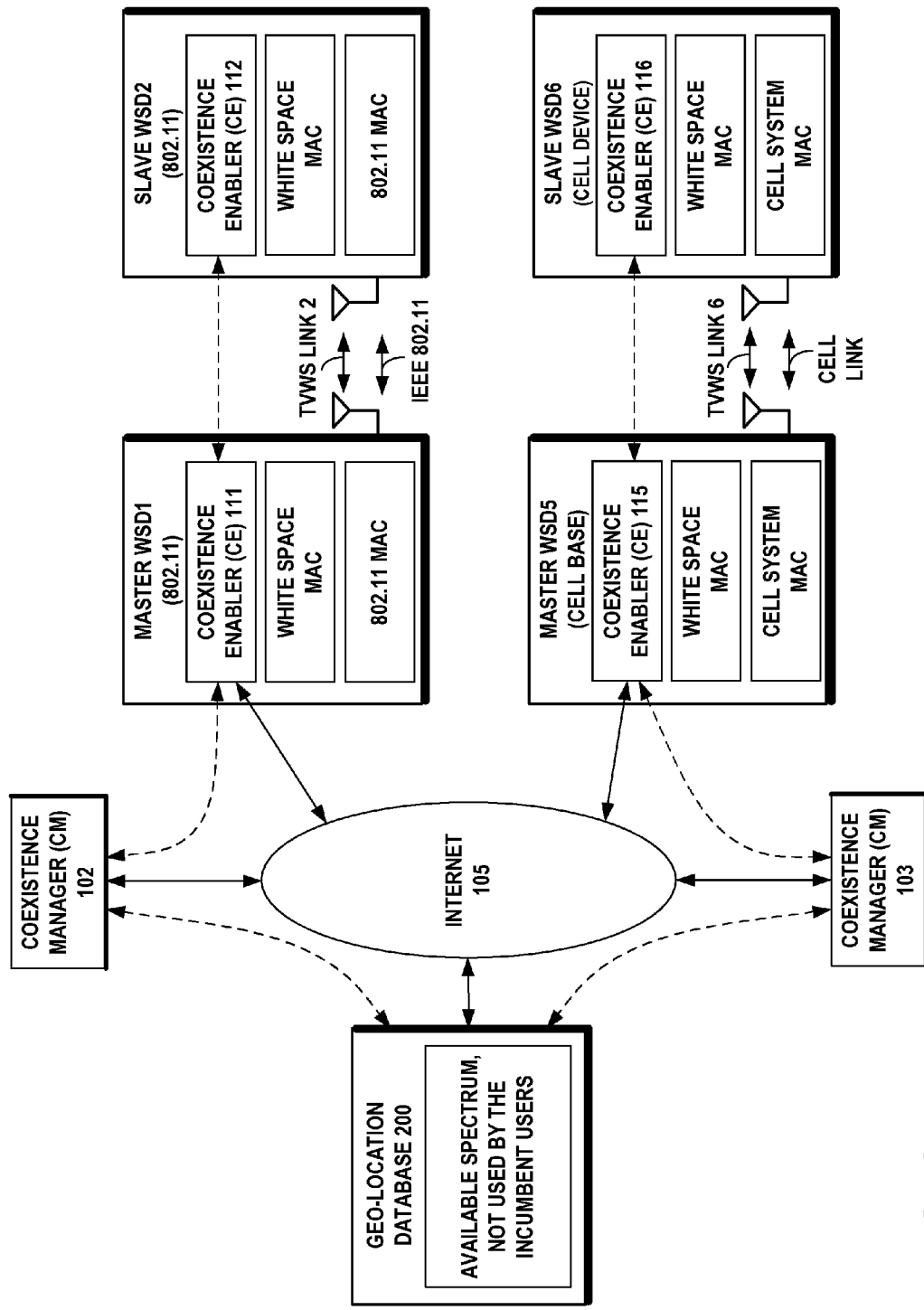
FIG. 1B is an example system architecture according to an example embodiment of the invention, illustrating example communication paths over the Internet between a control node or coexistence enabler CE for the master WSD device, a network controller or coexistence manager CM serving the master WSD device, and the geo-location database. Also shown is a control node or coexistence enabler for the second WSD device and a network controller or coexistence manager CM serving the second WSD device, in an example embodiment of the invention.

FIG. 1B is an example system architecture according to an embodiment of the present invention, illustrating an example communication paths over the Internet 105 between the control node or coexistence enabler 111 for the IEEE 802.11 master device WSD1, the network controller or coexistence manager CM 102 serving WSD1, and the device management for geo-location database 200. A network of distributed coexistence managers may communicate with one another over the Internet, in an example embodiment of the invention.

In an example embodiment of the invention, a network of distributed coexistence managers 102 and 103 may communicate with one another over the Internet 105. According to an example embodiment of the invention, the control node or coexistence enabler 111 in the master WSD1 may communicate over the Internet 105 with the TVWS coexistence manager 102. According to an alternate example embodiment of the invention, the control node or coexistence enabler 111 in the master WSD1 may be collocated with the TVWS coexistence manager 102. The coexistence enabler 115 in the master WSD5 may communicate over the Internet 105 with the TVWS coexistence manager 103. The distributed coexistence managers 102 and 103 may communicate over the Internet with the geo-location database 200 assisting the coexistence managers 102 and 103, in an example embodiment of the invention. Master WSD1 may be registered through the control node or coexistence enabler 111 to the network controller or coexistence manager 102. Master WSD5 may be registered through the control node or coexistence enabler 115 to the network controller or coexistence manager 103.

The coexistence enabler 111 may obtain information required for coexistence from a traffic network or device representing it. This may include configuration and control of measurements. Also, the coexistence enabler 111 may provide reconfiguration commands and control information to the master WSD1, corresponding to coexistence decisions received from coexistence managers 102 and 103, respectively. The coexistence manager 102 is responsible for discovery of Coexistence Managers (CM)s 103 managing neighboring wireless networks, for example, and coexistence related information may be exchanged with them. The coexistence manager 102 or 103 may have the needed information to make decisions of resource sharing among the Coexistence Managers (CM)s managing neighboring wireless networks.

The coexistence manager 102 handles resource requests from the coexistence enabler 111 in master WSD1. The coexistence manager 103 handles resource requests from the coexistence enabler 115 in master WSD5. The master WSD1 includes IEEE 802.11 MAC and PHY to communicate over its network. The master WSD5 cell system includes a cellular 3GPP standard MAC and PHY to communicate over its network. The coexistence enablers 111 and 115 in master WSD1 and in master WSD5 send resource requests to the respective coexistence managers 102 and 103.

The example system architecture of FIG. 1B shows the coexistence manager 102 receiving a resource request from the coexistence enabler 111 in master WSD1. The coexistence manager 102 has received Spectrum sensing results and network parameters from the coexistence enabler 111 in master WSD1. Network parameters may include specific user requirements (user load, QoS, priority, etc), aggregate spectral efficiency, etiquette (first come, first served, etc.), and user or network policies. The coexistence manager 102 accesses a primary database 104 in FIG. 5D to obtain available secondary channels in the TV band white space. The coexistence manager 102 accesses the coexistence network element coexistence discovery and information server (CDIS) 107 in FIG. 5D to obtain potential neighbor networks' addresses. The coexistence manager 102 processes this data in conjunction with Spectrum maps, Operational parameters, and Time base sync, to determine a resource reallocation for the coexistence enabler 111 in master WSD1. The coexistence manager 102 then sends to the coexistence enabler 111 in master WSD1 the resource reallocation, including Operational parameters, Quiet period parameters, Spectrum sensing strategy, and/or Time base sync. The coexistence enabler 111 in master WSD1 then controls at least one of the medium access control (MAC) and the physical layer (PHY) and the Radio resource Control (RRC) and the Radio Resource Management (RRM) to communicate in channels in the TV white spaces band reallocated by the coexistence manager 102, without interference from other networks sharing the same white space channels. A similar operation may be carried out by the coexistence manager 103 in conjunction with the coexistence enabler 115 in master WSD5. A network of distributed coexistence managers 102 and 103 may communicate with one another over the Internet 105.

Figure 2A:
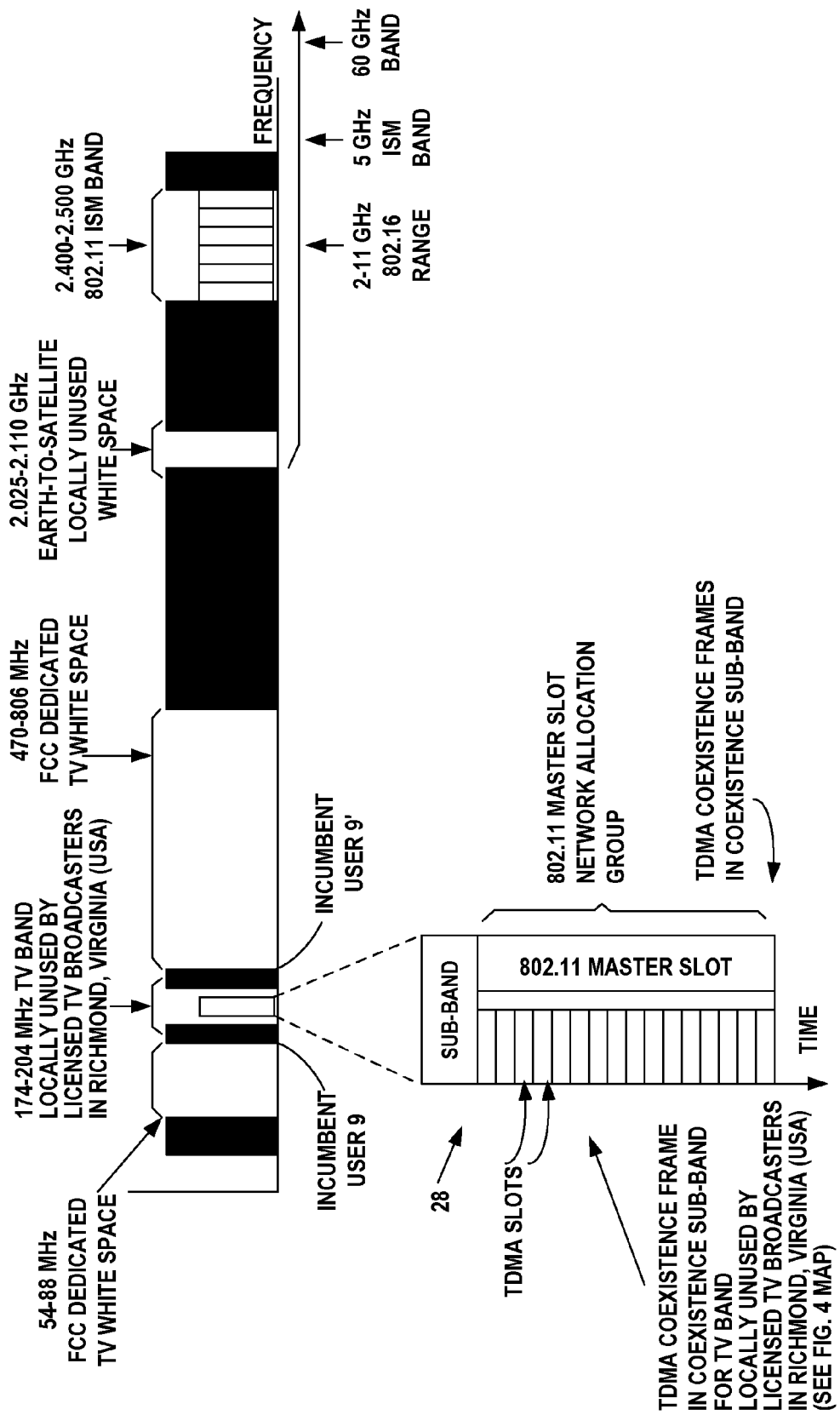
FIG. 2A is an example frequency band diagram illustrating an example TDMA coexistence frame sub-band 28 in the TV band white space locally unused by licensed TV broadcasters in the 174-204 MHz band, representing broadcast TV channels 7, 8, 9, 10, and 11 in the Richmond, Va. (USA) area, as shown in FIG. 4, an example TDMA coexistence frame 22 in sub-band 12 in the FCC dedicated TV band white space of 470-806 MHz, and an example TDMA coexistence frame 26 in sub-band 16 in the earth station-to-satellite locally unused white space spectrum 2.025 GHz to 2.110 GHz, according to an embodiment of the present invention.
Figure 4:
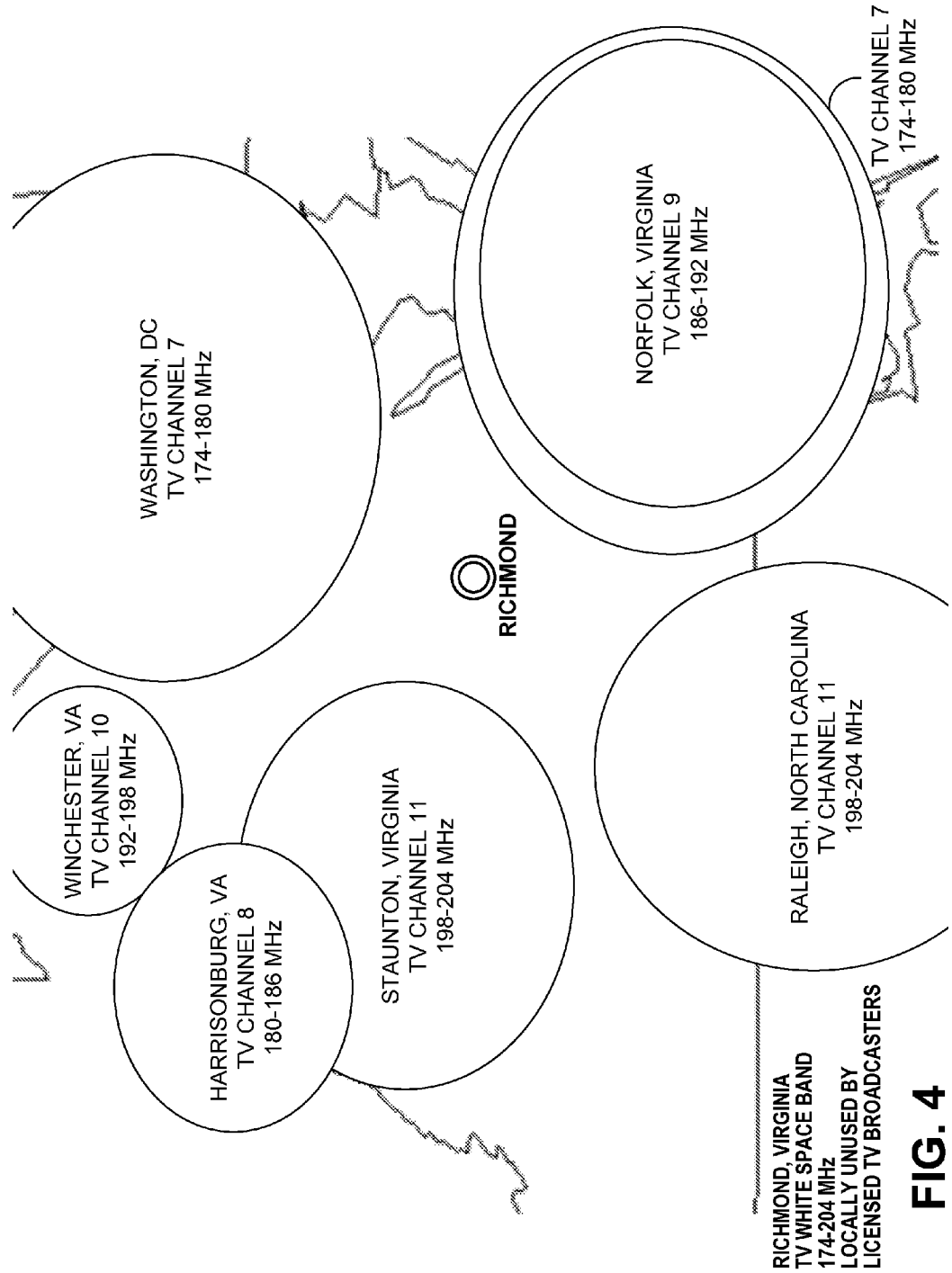
FIG. 4 is an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band, according to an embodiment of the present invention.

FIG. 2A is a non-limiting example frequency band diagram illustrating an example TDMA coexistence frame sub-band 28 in the TV band white space locally unused by licensed TV broadcasters in the 174-204 MHz band, representing broadcast TV channels 7, 8, 9, 10, and 11 in the Richmond, Va. (USA) area, as shown in FIG. 4, according to an embodiment of the present invention. License-exempt access to these bands as a secondary use for coexistence of networks requesting additional resources, may include restrictions on geographic location, transmission power, range, and bandwidth of the transmissions of the requesting networks.

As a non-limiting example, the 802.11 WLAN standards specify frequencies for operation in the 2.400-2.500 GHz ISM band, the 5 GHz ISM band, and the IEEE 802.1 lad Very High Throughput 60 GHz band. The 802.11 WLAN standards specify an OFDM-based physical layer with a bandwidth of 20 MHz channel separation. At 11 MHz from the center of the channel, the energy is approximately 20 dB lower than the maximum signal level. Further away from the center frequency, the energy levels fall further resulting in minimal interference on adjacent channels. The TV band white spaces at 54-88 MHz and at 470-806 MHz are good candidates for coexistence of an 802.11 WLAN wireless LAN channel. The earth station-to-satellite white space spectrum at 2.025 GHz to 2.110 GHz is a good candidate for coexistence of an 802.11 WLAN wireless LAN channel. A TV band white space locally unused by licensed TV broadcasters, for example, in the 174-204 MHz band, representing the local absence of broadcast TV channels 7, 8, 9, 10, and 11, as is the circumstance in the Richmond, Va. (USA) area, is a good candidate for coexistence of an 802.11 WLAN wireless LAN channel.

FIG. 2A shows a non-limiting example of the location of the white spaces in the RF spectrum and example TDMA coexistence frames in the white space spectrum, showing the freely available time slots before any networks have been allocated slots. The white spaces include the FCC dedicated TV white space 54-88 MHz band, the FCC dedicated TV white space 470-806 MHz band, and locally unused the earth station-to-satellite white space spectrum in 2.025 GHz to 2.110 GHz.

In an example embodiment of the invention, there are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

Figure 2B:
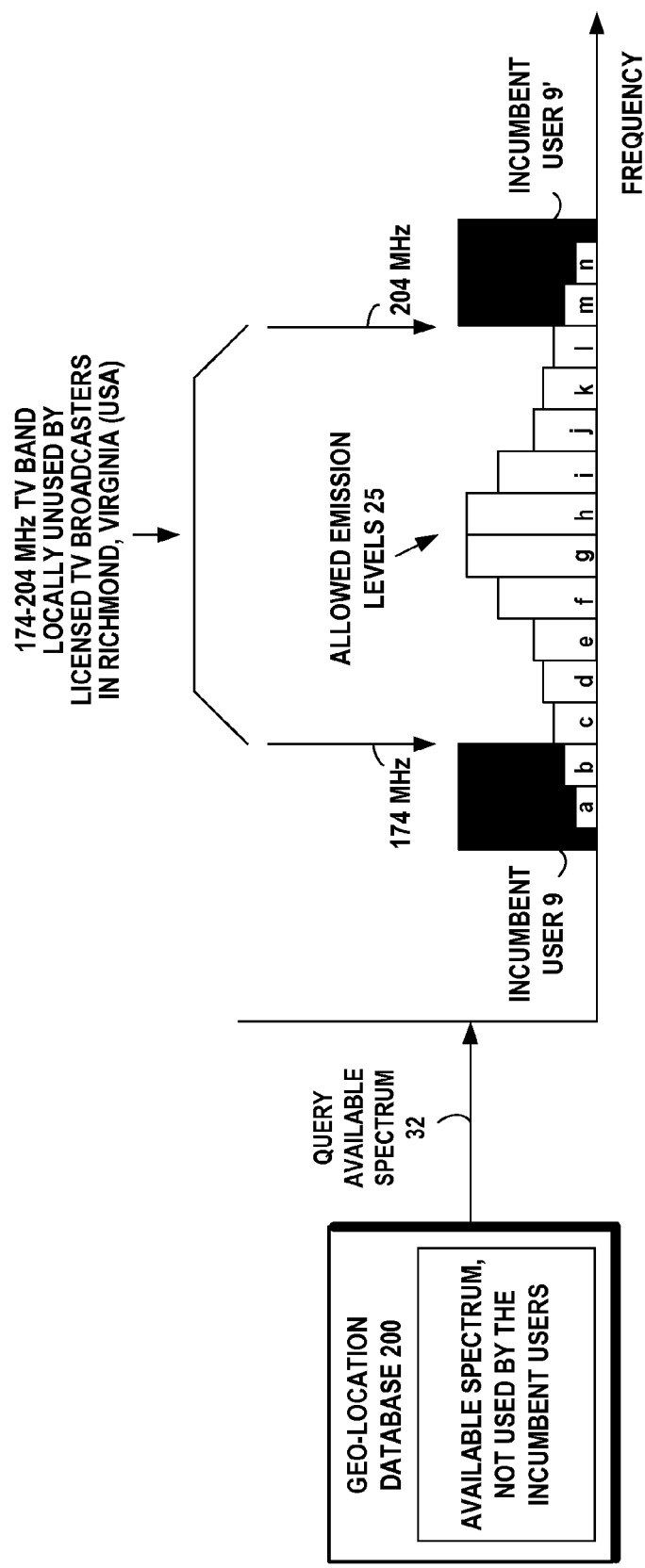
FIG. 2B is an example frequency band diagram illustrating an example of the geo-location database responding to a query by returning the allowed emission levels at a geo-location, which will not significantly interfere with signals of incumbent users at the geo-location, according to an embodiment of the present invention.

FIG. 2B is a non-limiting example frequency band diagram illustrating an example of the geo-location database 200 responding to a query 32 by returning the allowed emission levels 25 in a 30 MHz wide TV band from 174-204 MHz, at a geo-location. An allowed emission level may be the maximum allowed intentional or unintentional power level that may be generated by a transmitter at a defined frequency. The allowed emission levels 25 will not significantly interfere with signals of incumbent user 9 (broadcast TV channel 6) or incumbent user 9' (broadcast TV channel 12) at the geo-location, according to an embodiment of the present invention. Superimposed on the white space spectrum are the fourteen allowed emission levels identified as "a" through "n", each being 10 MHz wide. It is seen that allowed emission levels "a", "b", "m", and "n" overlap the incumbent signals 9 and 9', but are small enough in effective isotropic radiated power (EIRP) so as to not represent a significant interference with the incumbent signals 9 and 9'.

Figure 3A:
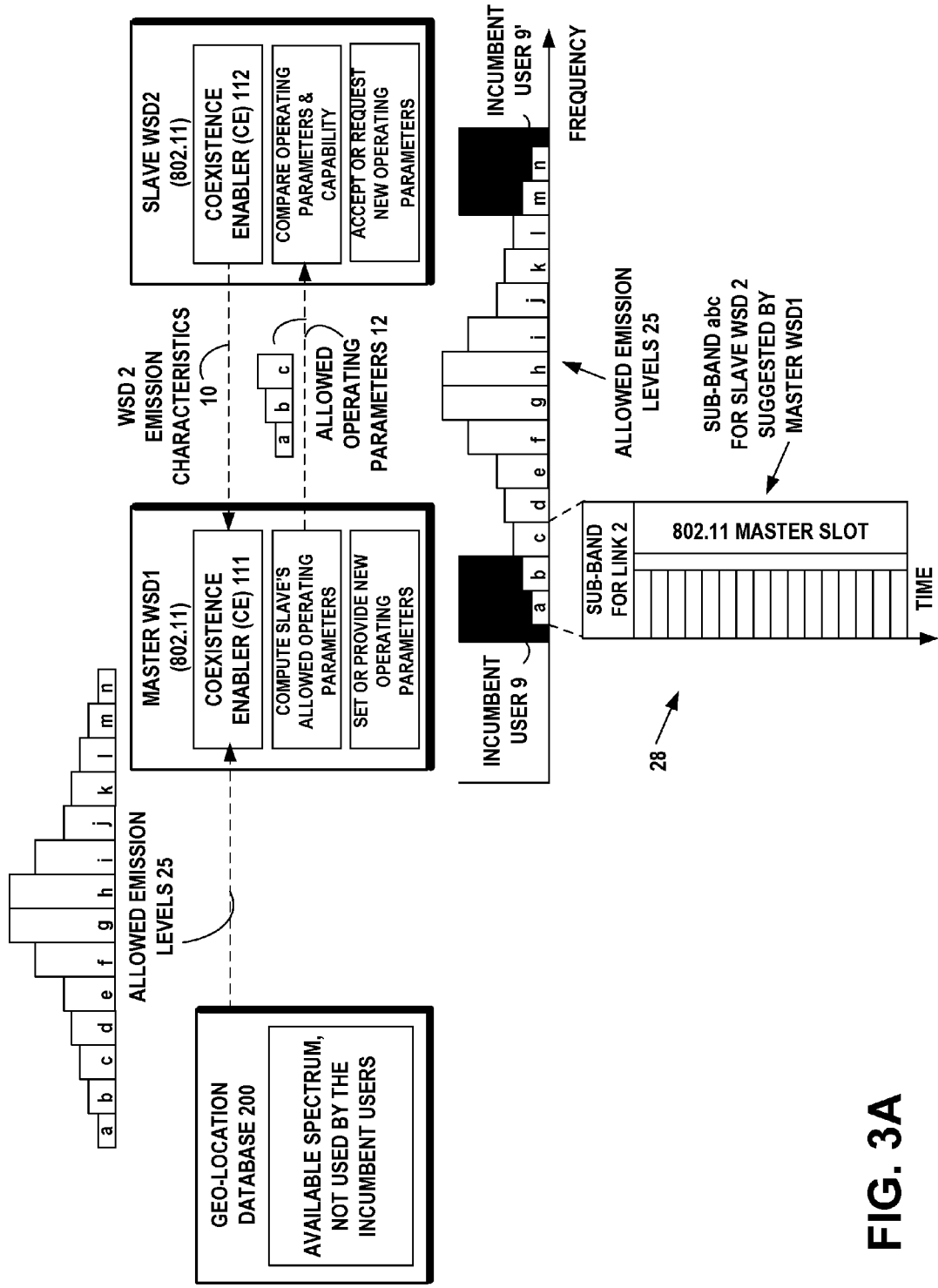
FIG. 3A is an example illustration of the master WSD receiving from the geo-location database, the allowed emission levels at its geo-location in response to its query, receiving the emission characteristics from its associated slave WSD, computing a allowed operating parameters for the slave WSD, and transmitting the allowed operating parameters to the slave WSD. Also shown is the coexistence frame sub-band suggested by the master WSD device to the slave WSD device, according to an embodiment of the present invention.

FIG. 3A is an example illustration of the master WSD1 receiving from the geo-location database 200, the allowed emission levels 25 at its geo-location, in response to its query 32. The master WSD1 is shown receiving the emission characteristics 10 from its associated slave WSD2. The emission characteristics of slave WSD2 may include its transmission power at a characteristic bandwidth and the related unintentionally transmitted power around the characteristic bandwidth. The master WSD1 is shown computing allowed operating parameters 12 within the allowed emission levels "a", "b", and "c" for the slave WSD2. In accordance with an embodiment of the invention, the allowed operating parameters may include a white space emission mask for slave WSD2, which is the allowed transmission power at a characteristic bandwidth, as a function of frequency, maintained within the limits of the allowed emission level requirement when using the emission characteristics of slave WSD2. The master WSD1 is shown transmitting the allowed operating parameters 12 to the slave WSD2. Also shown is the coexistence frame sub-band 28 suggested by the master WSD1 device to the slave WSD2 device, according to an embodiment of the present invention.

In another example embodiment, the master WSD1 may send the received emission characteristics 10 to geo-location database 200. Database 200 may then compute the allowed operating parameters for the slave WSD2 based on the received emission characteristics 10. Database 200 may send the allowed operating parameters to master WSD1, and master WSD1 may forward these parameters to the slave WSD2.

Figure 3B:
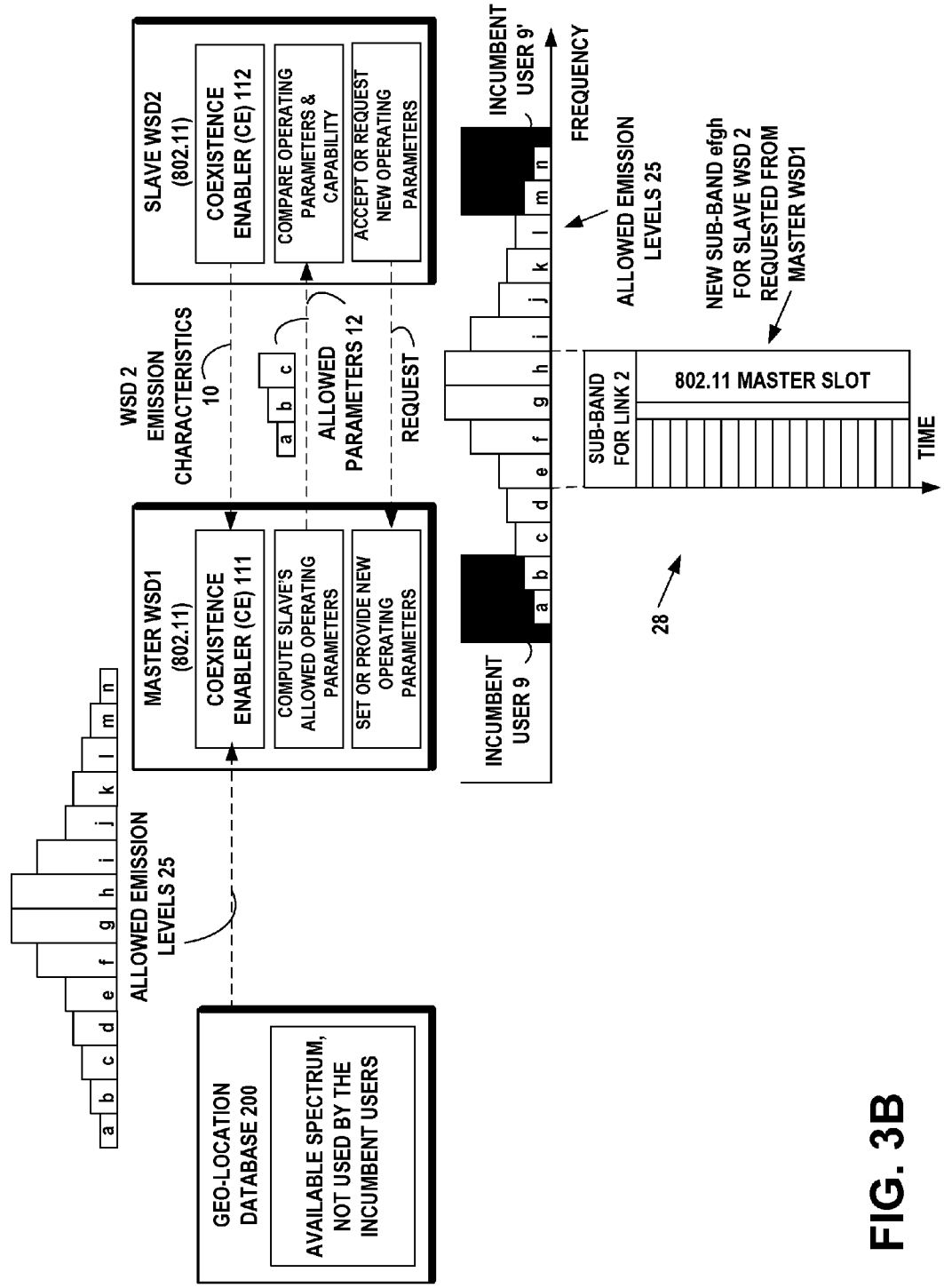
FIG. 3B is an example illustration of the slave WSD receiving the allowed operating parameters from the master WSD, comparing the allowed operating parameters with the capabilities and requirements of the slave WSD, and requesting new allowed operating parameters. Also shown is the new coexistence frame sub-band resulting from the request to the master WSD device, according to an embodiment of the present invention.

FIG. 3B is an example illustration of the slave WSD2 receiving the allowed operating parameters from the master WSD1. The slave WSD2 is shown comparing the allowed operating parameters 12 with the capabilities and requirements of the slave WSD2. The slave WSD2 is shown requesting a new allowed operating parameters since its capabilities would enable it to transmit with greater power and/or less bandwidth than are represented by the allowed operating parameters 12. If the master provided all allowed operating parameters to the slave, then the slave would only need to select suitable parameters and there would be no need to request new operating parameters. But if the master provided only portion of the operating parameters, the slave may request additional and possibly better parameters. There may be different combinations of requested transmission power and bandwidth (all combinations of greater/same/smaller power and narrower/same/larger bandwidth.) The slave WSD2 is shown requesting the master WSD device for the new allowed operating parameters. Also shown is the new coexistence frame sub-band "efgh" resulting from the request to with the master WSD1 device, according to an embodiment of the present invention. The slave WSD may compare the current transmit power with the emission characteristics it has provided to the master. If the current transmit power is such that the emission characteristics are better, then it may send these better emission characteristics to the master. In example embodiments of the invention, the slave may provide the characteristics with which it is able to operate, and the master would calculate the operating parameters it will use with the slave link (that are otherwise allowed). The master device (or alternately the database) may then update the allowed operating parameters, for example to allow more bandwidth. The slave device may receive all allowed operating parameters for which it may later request resources, when they are needed, or it may only receive the operating parameters or a set of operating parameters which the master proposes to use.

FIG. 4 shows an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band, as shown in FIG. 2A. The cities where there are TV broadcasters for TV channels 7, 8, 9, 10, and 11 in a circular area of approximately 160 kilometers in diameter surrounding the city of Richmond, Va., are shown in the following table. The map of FIG. 4 shows that there is no coverage by licensed TV broadcasters in the 174-204 MHz band, which is therefore a locally available TV band white space.

| | | |
|---|---|---|
| WASHINGTON, DC | TV CHANNEL 7 | 174-180 MHz |
| NORFOLK, VIRGINIA | TV CHANNEL 7 | 174-180 MHz |
| HARRISONBURG, VA | TV CHANNEL 8 | 180-186 MHz |
| WASHINGTON, DC | TV CHANNEL 9 | 186-192 MHz |
| NORFOLK, VIRGINIA | TV CHANNEL 9 | 186-192 MHz |
| WINCHESTER, VA | TV CHANNEL 10 | 192-198 MHz |
| RALEIGH, NC | TV CHANNEL 11 | 198-204 MHz |
| STAUNTON, VIRGINIA | TV CHANNEL 11 | 198-204 MHz |

Figure 5A:
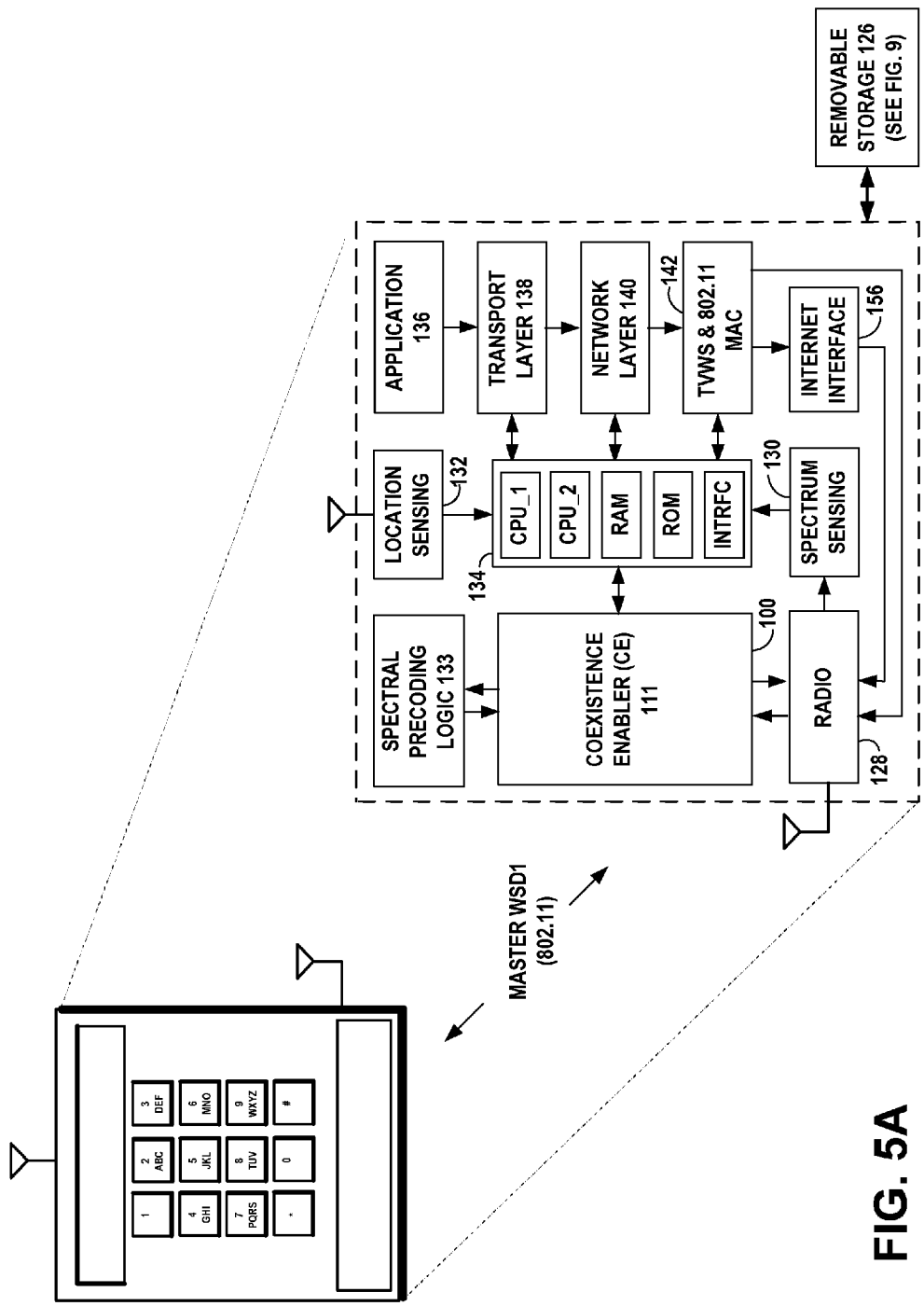
FIG. 5A is a functional block diagram according to an example embodiment of the invention, illustrating an example master WSD1 device including the control node or coexistence enabler for the wireless device. The device may be configured to operate in the TVWS coexistence bands or additional RF spectrum white space spectrum where there may be no primary user radios operating in the neighboring wireless networks, in an example embodiment of the invention.

FIG. 5A is a functional block diagram according to an example embodiment of the invention, illustrating an example master WSD1 device including the control node or coexistence enabler 111 for the wireless device. The device may be configured to operate in the TVWS coexistence bands or additional RF spectrum bands where there may be no primary user radios operating in the neighboring wireless networks, in an example embodiment of the invention.

In an example embodiment of the invention, master WSD1 includes a protocol stack, including the radio 128 and the IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example master WSD1 may include a processor 134 that includes a dual or multi core central processing unit CPU_1 and CPU_2, a RAM memory, a ROM memory, and an interface for a keypad, display, and other input/output devices. A location sensor 132, such as a GPS may be included to establish the geographic location of the master WSD1, and the location of the master WSD1 is reported to the network controller or coexistence manager 102. The coexistence enabler 111 may send resource requests to the coexistence manager 102. The MAC 142 includes integrated TV white space features to communicate using the radio 128 in channels in the TV white spaces band reallocated by the coexistence manager 102, without mutual interference. The spectrum sensor 130 senses the electromagnetic environment of the master WSD1 and reports it to the coexistence manager 102.

In an example embodiment of the invention, the geo-location database 200 may communicate the allowed emission levels 25 via the Internet 105 to the coexistence manager CM 102, which forwards the allowed emission levels 25 via the Internet 105 to coexistence enabler 111 in the master WSD1.

In an example embodiment of the invention, the master WSD1 includes spectral decoding logic 133. When input data are not properly correlated, a rectangularly-pulsed OFDM signal is discontinuous in phase and thus exhibits large power spectral sidelobes decaying asymptotically as the frequency. Such large sidelobes cause strong interference to adjacent channels and need to be suppressed before transmission. Spectral precoding is capable of suppressing sidelobe powers effectively without trading off system error performance or implementation complexity. By spectral precoding, significant sidelobe suppression is achieved by precoding data symbols in frequency domain without resort to specific data values. The idea is to introduce correlation among data symbols by a fixed precoder matrix in a way that the spectrally-precoded rectangularly-pulsed OFDM signal exhibits extremely small power spectral sidelobes decaying asymptotically, and thereby high spectral efficiency. Spectral precoders are all invertible and thus enable realizable decoding at the receiver while providing good system error performance. An example spectral decoder is described in the publication by Char-Dir Chung, "Spectral Precoding for Constant-Envelope OFDM", *IEEE Transactions on Communications*, vol. 58, no. 2, February 2010, pages 555-567.

In an example embodiment of the invention, the interface circuits in FIG. 5A may interface with one or more radio transceivers, battery and other power sources, key pad, touch screen, display, microphone, speakers, ear pieces, camera or other imaging devices, etc. The RAM and ROM may be removable memory devices such as smart cards, subscriber identity modules (SIMs), wireless identification modules (WIMs), semiconductor memories such as RAM, ROM, PROMS, flash memory devices, etc, as shown in FIG. 9. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

The master WSD1 of FIG. 5A includes processor 134 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, semiconductor memory circuit devices and micro-SD memory cards (SD refers to the Secure Digital standard) are shown at 126 and in FIG. 9, and may serve, for instance, as a data input/output means. Code may include any interpreted or compiled computer language including computer-executable instructions. The code and/or data may be used to create software modules such as operating systems, communication utilities, user interfaces, more specialized program modules, etc.

Figure 5B:
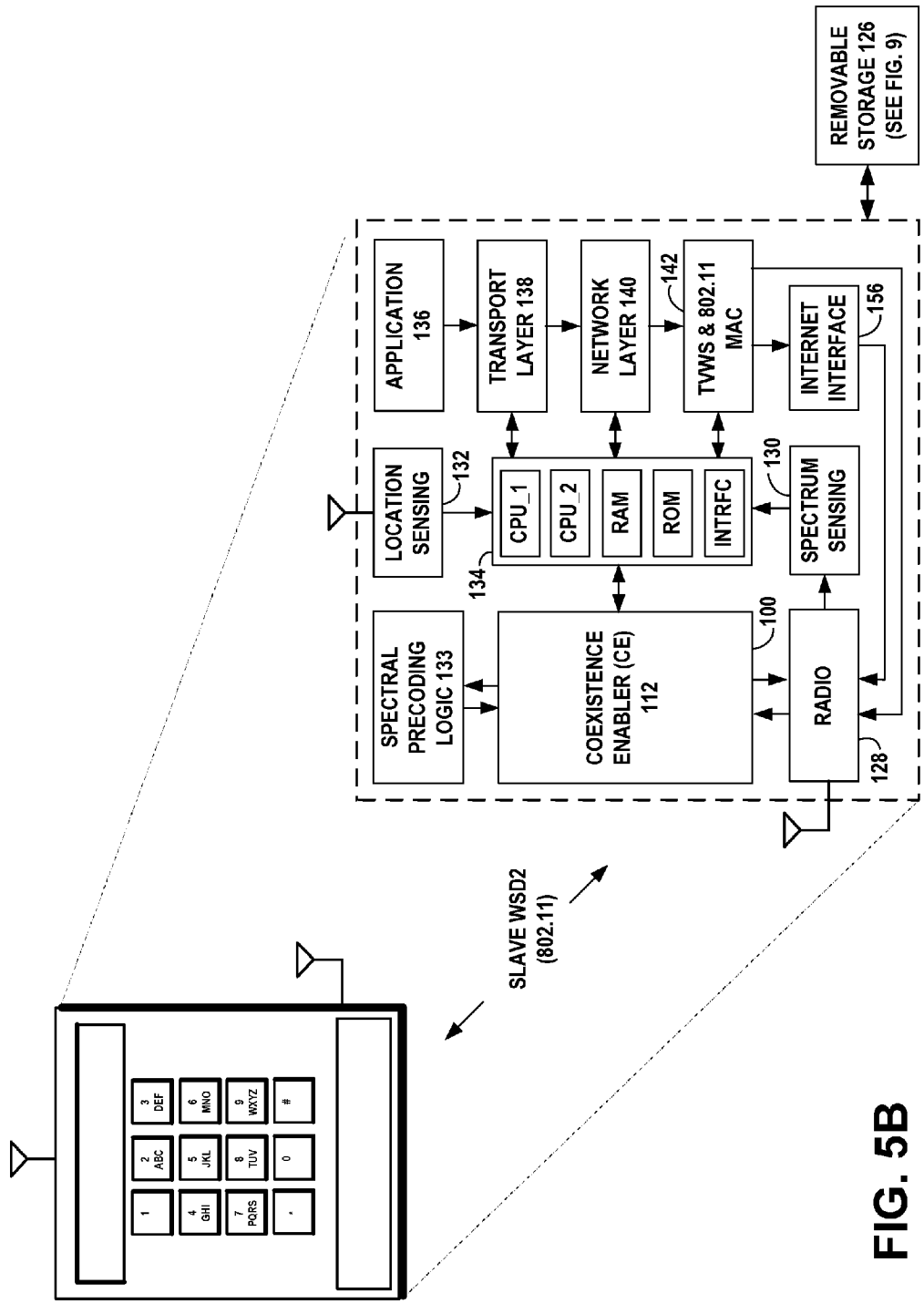
FIG. 5B is a functional block diagram according to an example embodiment of the invention, illustrating an example slave WSD device including the control node or coexistence enabler for the wireless device. The device may be configured to operate in the TVWS coexistence bands or additional RF spectrum white space spectrum there may be no primary user radios operating in the neighboring wireless networks, in an example embodiment of the invention.

FIG. 5B is a functional block diagram according to an example embodiment of the invention, illustrating an example slave WSD2 device including the control node or coexistence enabler 112 for the wireless device. The device may be configured to operate in the TVWS coexistence bands or additional RF spectrum bands there may be no primary user radios operating in the neighboring wireless networks, in an example embodiment of the invention.

In an example embodiment of the invention, slave WSD2 includes a protocol stack, including the radio 128 and the IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example slave WSD2 may include a processor 134 that includes a dual or multi core central processing unit CPU_1 and CPU_2, a RAM memory, a ROM memory, and an interface for a keypad, display, and other input/output devices. A location sensor 134, such as a GPS may be included to establish the geographic location of the slave WSD2, and the location of the slave WSD2 is reported to the network controller or coexistence manager 102. The coexistence enabler 112 may send resource requests to the coexistence manager 102. The MAC 142 includes integrated TV white space features to communicate using the radio 128 in channels in the TV white spaces band reallocated by the coexistence manager 102, without mutual interference. The spectrum sensor 130 senses the electromagnetic environment of the slave WSD2 and reports it to the coexistence manager 102. In an example embodiment of the invention, the slave WSD2 includes spectral decoding logic 133.

In an example embodiment of the invention, the geo-location database 200 may communicate the allowed emission levels 25 via the Internet 105 to the coexistence manager CM 102, which forwards the allowed emission levels 25 via the Internet 105 to coexistence enabler 112 in the slave WSD2.

In an example embodiment of the invention, the interface circuits in FIG. 5B may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc, as shown in FIG. 9. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

The slave WSD2 of FIG. 5B includes processor 134 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, semiconductor memory circuit devices and micro-SD memory cards are shown at 126 and in FIG. 9, and may serve, for instance, as a data input/output means. Code may include any interpreted or compiled computer language including computer-executable instructions. The code and/or data may be used to create software modules such as operating systems, communication utilities, user interfaces, more specialized program modules, etc.

Figure 5C:
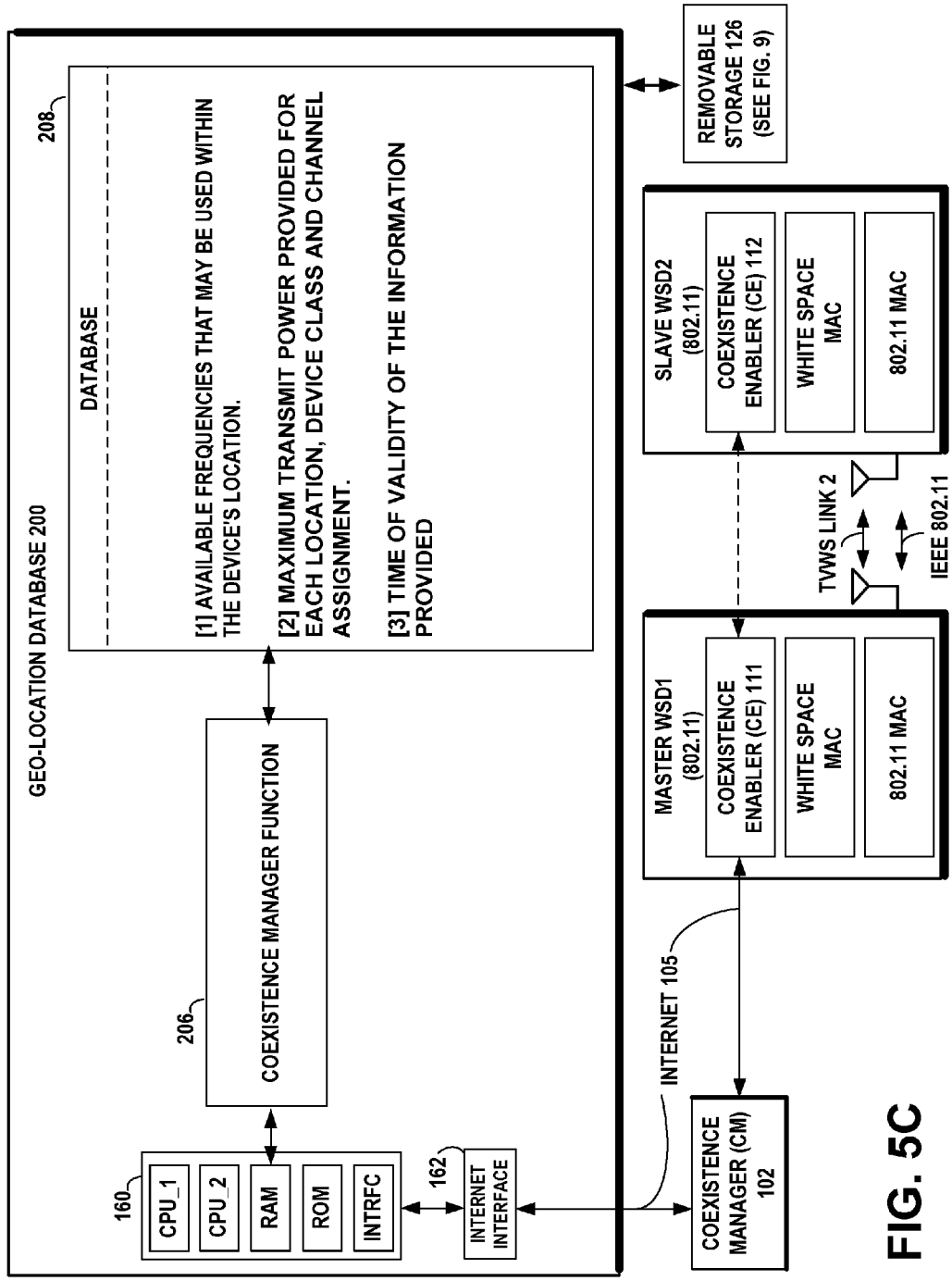
FIG. 5C is a functional block diagram according to an example embodiment of the invention, illustrating an example geo-location database and example communication paths over the Internet with the network controller or coexistence manager CM serving the master WSD device, in an example embodiment of the invention.

FIG. 5C is a functional block diagram according to an example embodiment of the invention, illustrating an example geo-location database 200 and example communication paths over the Internet 105 with the network controller or coexistence manager CM serving the master WSD1 device, in an example embodiment of the invention.

The geo-location database 200 includes a processor 160 that includes a RAM storing the database in a memory partition of the RAM. The RAM in the processor 160 also stores the coexistence manager function 206 in a memory partition of the RAM, which enables communication via the Internet interface 162 and the Internet 105 to the coexistence manager CM 102, for forwarding via the Internet 105 to coexistence enabler 111 in the master WSD1. In example embodiments of the invention, the database may also be stored in a separate storage device coupled to the processor 160.

The geo-location database 200 may store information that may include the following.

[1] The geo-location database 200 may store available frequencies that may be used within the WSD device's location. Frequency information may be based on a particular bandwidth or alternatively may be provided as a start and end frequency. The frequency availability will be valid across an area comprising of one or more pixels, where a pixel may be defined as a square of pre-determined dimension, for example, 100 m×100 m. WSDs that move outside the current pixel or set of pixels (including a certain safety radius taking into account location uncertainty), within which they know they are allowed to transmit, may re-consult the geo-location database to get information about their new location before they transmit again.

[2] The geo-location database 200 may store the maximum transmit power for each WSD location, device class and channel assignment. Alternately the database may store maximum allowed emission levels for each channel that would be the same for all devices in same geo-location.

[3] The geo-location database 200 may store the appropriate national/regional database to consult.

[4] The geo-location database 200 may store the time of validity of the information provided, which defines the interval during which the available frequencies and the associated emission limits may be used without re-consultation by the WSD in its location or in the area the WSD addressed in its query. If the WSD needs available frequencies after the end of the validity time, or if it moves, it may re-consult the database.

[5] The geo-location database 200 may store information that flags the need of sensing in conjunction with the geo-location at a given frequency.

In an example embodiment of the invention, the RAM and ROM of the geo-location database 200 shown in FIG. 5C, may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of an example embodiment of the invention. The program logic may be delivered to the writeable RAM, PROMS, flash memory devices, etc. of the coexistence enabler from a computer program product or article of manufacture in the form of a non-transitory computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

The geo-location database 200 of FIG. 5C includes processor 160 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, semiconductor memory circuit devices and micro-SD memory cards are shown at 126 and in FIG. 9, and may serve, for instance, as a data input/output means. Code may include any interpreted or compiled computer language including computer-executable instructions. The code and/or data may be used to create software modules such as operating systems, communication utilities, user interfaces, more specialized program modules, etc.

Figure 5D:
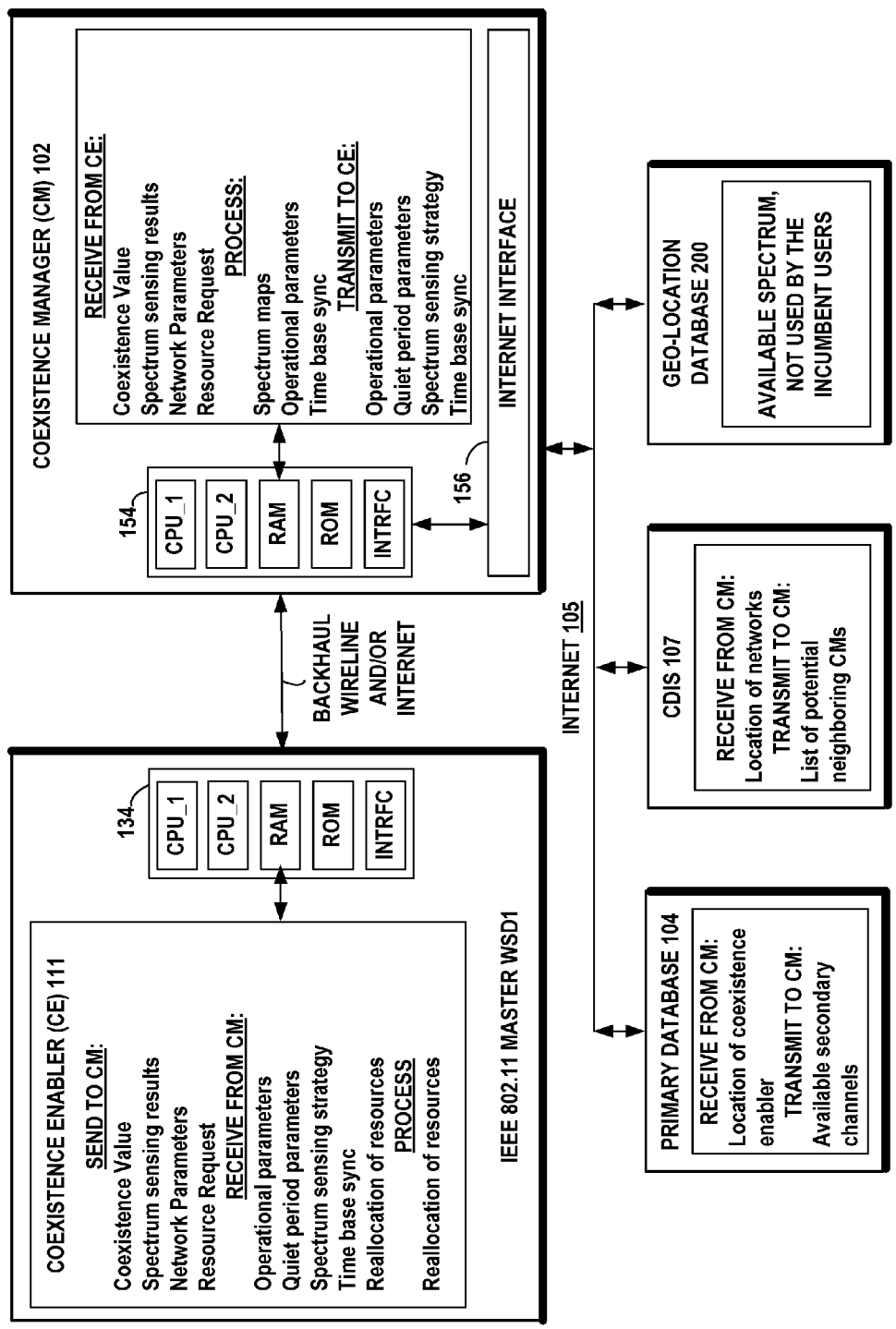
FIG. 5D is an example network diagram according to an embodiment of the present invention, illustrating the control node or coexistence enabler, communicating over a backhaul wireline and/or internet link with the network controller or coexistence manager, in an example embodiment of the invention.

FIG. 5D is an example network diagram according to an embodiment of the present invention, illustrating the control node or coexistence enabler 111, communicating over a backhaul wireline and/or internet link with the network controller or coexistence manager 102, in an example embodiment of the invention. The coexistence manager CM 102 may communicate over the internet 105 with the geo-location database 200, the primary database 104, and the coexistence network element coexistence discovery and Information server (CDIS) 107, in an example embodiment of the invention.

FIG. 6A is an example flow diagram of operational steps in the master white space device, according to an embodiment of the present invention. The steps of the flow diagram 600 of FIG. 6A may represent computer code instructions stored in the RAM and/or ROM memory of the master white space device, which when executed by the central processing units (CPU), carry out the functions of an example embodiment of the invention. The steps may be carried out in another order than shown and individual steps may be combined or separated into component steps.

Step 602: receiving, in a first white space device, information relating to allowed emission levels in a white space radio system;

Step 604: receiving by the first white space device, information relating to emission characteristics of a second white space device or at least one slave white space device, received from the second white space device;

Step 606: computing by the first white space device, one or more allowed operating parameters for the second white space device or the at least one slave white space device, based on the received information relating to allowed emission levels and the received emission characteristics; and Step 608: transmitting at least one of the allowed operating parameters to the second white space device.

FIG. 6B is an example flow diagram of operational steps in the slave white space device, according to an embodiment of the present invention. The steps of the flow diagram 650 of FIG. 6B may represent computer code instructions stored in the RAM and/or ROM memory of the slave white space device, which when executed by the central processing units (CPU), carry out the functions of an example embodiment of the invention. The steps may be carried out in another order than shown and individual steps may be combined or separated into component steps.

Step 652: receiving, by a slave white space device, one or more initial operating parameters calculated at least partly based on allowed emission levels for the slave white space device and minimum emission characteristics, received from a master white space device;

Step 654: transmitting, by the slave white space device, information relating to emission characteristics of the slave white space device using the initial operating parameters; and Step 656: receiving by the slave white space device, one or more allowed operating parameters calculated at least partly based on the emission characteristics of the slave white space device.

FIG. 7 is an example frequency band diagram illustrating an example TDMA coexistence frame 24' in sub-band 14' in an unpaired time domain duplex frequency white space of 900 to 905 MHz in the uplink portion of a mobile device communications frequency band, according to an example embodiment of the invention. FIG. 7 illustrates an example frequency plan for the example mobile device frequency band, with an uplink portion between 890 and 915 MHz and a down link portion between 935 and 960 MHz, similar to a portion of the frequency plan for GSM. In the example frequency plan shown in FIG. 7, a 5 MHz band between 945 and 950 MHz in the down link portion is reserved for other uses, for example as an emergency services band. Since the time domain duplex operation of the mobile device system requires matched uplink frequencies to the allocated down link frequencies, there is an unpaired band between 900 and 905 MHz in the uplink portion. In accordance with an example embodiment of the invention, the unpaired band between 900 and 905 MHz is used as a coexistence band. FIG. 7 shows an example TDMA coexistence frame 24' in sub-band 14' in the unpaired time domain duplex frequency white space 36 in the uplink portion of the mobile device frequency band, which may be used by the cell base master device WSD5 and the cell slave devices WSD6, WSD7, and WSD8 in FIG. 1A.

Figure 8A:
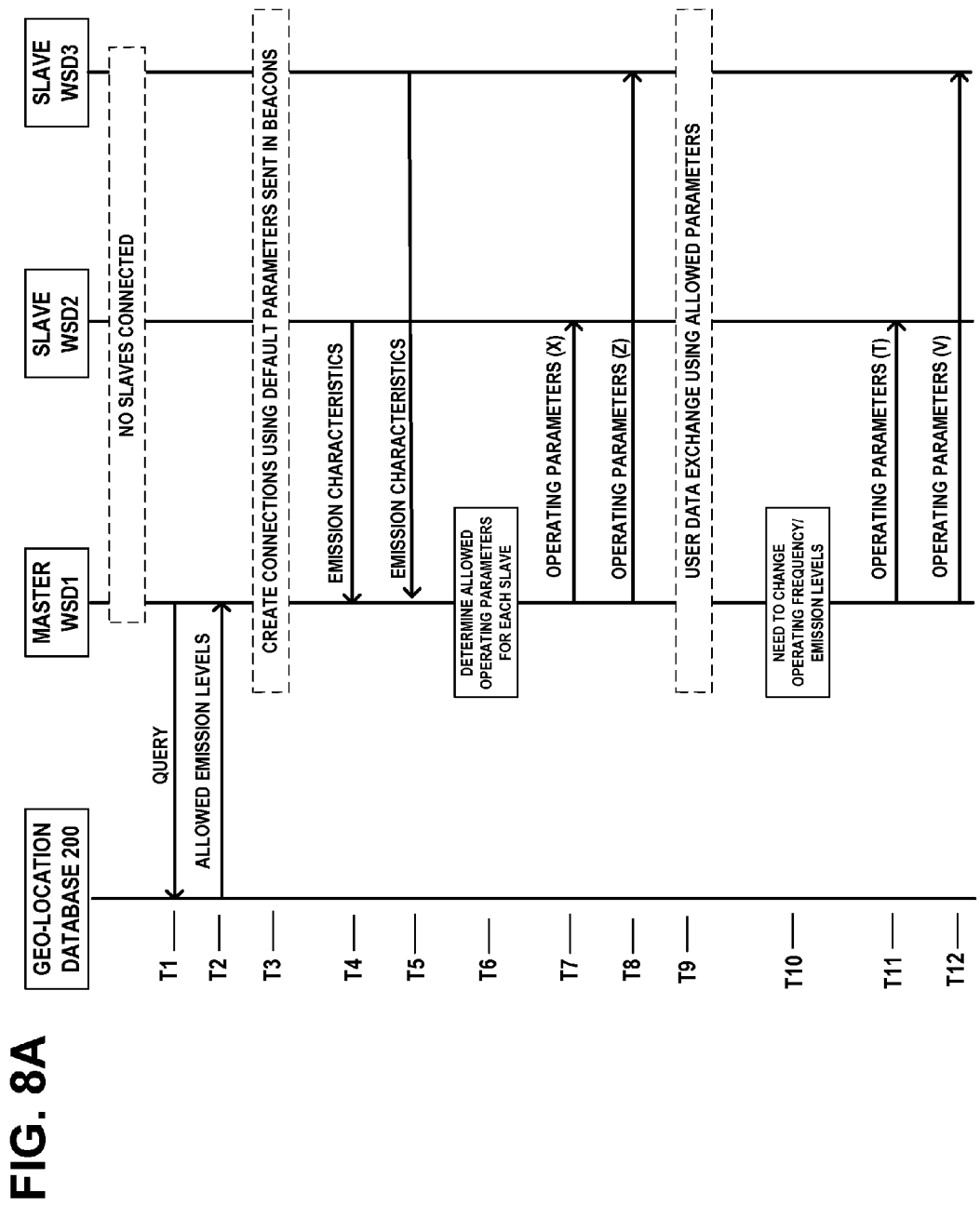
FIG. 8A is an example message sequence chart illustrating the signaling in WSD-centric method, according to an example embodiment of the invention.

FIG. 8A is an example message sequence chart illustrating the signaling in WSD-centric method, according to an example embodiment of the invention. In the WSD-centric approach, the geo-location database 200 provides the maximum allowed emission levels on each channel to the master WSD1, and the master WSD1 determines the operating parameters for itself and the slave WSD2, that is, channel and output power, based on the emission characteristics of the transmitter (for example, adjacent channel leakage ratio (ACLR) or emission mask).

In this example, slave WSD2 is capable of better emission characteristics than slave WSD3.

The geo-location database 200 may send the allowed emission levels for each channel to the master WSD1. Slave WSD2 and slave WSD3 of FIG. 1A, may send their emission characteristics to the master WSD1. The master WSD1 determines operating parameters for slave WSD2 and slave WSD3 separately, based on their emission characteristics and allowed emission levels. Because slave WSD2 has better emission characteristics, it may be allowed to use higher output power or wider bandwidth.

FIG. 8A shows a sequence of events at consecutive times T1 through T12 in WSD-centric method. In the beginning, before time T1, no slaves are connected.

At time T1, the master WSD1 sends a query to the geo-location database 200 to obtain the maximum allowed emission levels on each channel.

At time T2, the geo-location database 200 transmits the maximum allowed emission levels on each channel to the master WSD1.

At time T3, the master WSD1, slave WSD2 and slave WSD3 create connections using default parameters transmitted by the master WSD1 in beacons to the slave WSD2 and slave WSD3.

At time T4, slave WSD2 transmits its emission characteristics to the master WSD1.

At time T5, slave WSD3 transmits its emission characteristics to the master WSD1.

At time T6, the master WSD1 determines allowed operating parameters for each slave WSD2 and WSD3.

At time T7, the master device WSD1 transmits operating parameters "X" to slave WSD2.

At time T8, the master device WSD1 transmits operating parameters "Z" to slave WSD3.

At time T9, the master WSD1, slave WSD2 and slave WSD3 engage in user data exchange using the allowed operating parameters.

At time T10, the master WSD1 determines that there is a need to change the operating frequency and/or emission levels, for example due to new information received from the geo-location database 200, or due detected interference due the other users of the spectrum.

At time T11, the master device WSD1 transmits new operating parameters "T" to slave WSD2.

At time T12, the master device WSD1 transmits new operating parameters "V" to slave WSD3.

Figure 8B:
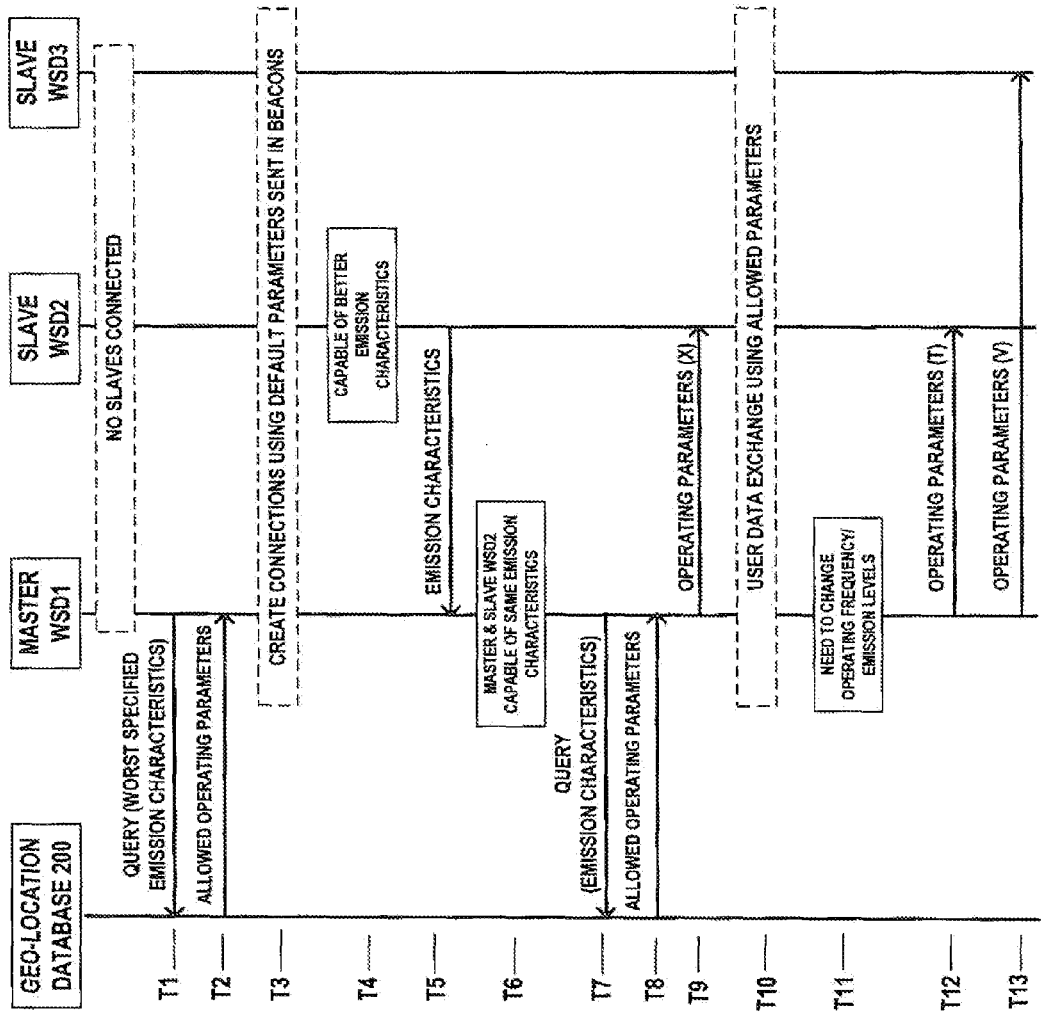
FIG. 8B is an example message sequence chart illustrating the signaling in DB-centric method, according to an example embodiment of the invention.

FIG. 8B is an example message sequence chart illustrating the signaling in a database-centric method, according to an example embodiment of the invention. In the database-centric approach, the master WSD1 provides information of the slaves' emission characteristics to the geo-location database 200. In example embodiments of the invention, the master WSD1 may not yet know the emission characteristics of the slave devices, for example, slave WSD2. There are at least two options for this: [1] master WSD1 may provide a set of potential emission characteristics to the geo-location database 200 and the database will provide output power and a set of channels based on them; or [2] master WSD1 may first connect to the slaves, for example, slave WSD2, using default parameters and receive the emission characteristics of the slave WSD2, then the master WSD1 sends a query to the geo-location database 200 with the slave WSD2's emission characteristics. This may be a set of potential emission characteristics, or emission characteristics of a slave, for example, WSD2, which are known or expected (for example, worst specified/default) by the master. The geo-location database 200 determines the available channels and the maximum allowed output power on each channel based on the received emission characteristics and sends the information back to the master WSD1. Master may forward all the information to the slaves, or only the information that is calculated based on slave's emission characteristics, for example, to the slave WSD2 of FIG. 1A. Either the master WSD1 or alternately the slave WSD2 may then select the operating parameters, for example, channel and output transmission power, from a list, which does not exceed the maximum output power allowed on that channel.

In this example, slave WSD2 is capable of better emission characteristics than the worst specified/default.

After slave WSD2 connects to the master WSD1, and master WSD1 receives its emission characteristics information, the master WSD1 may re-query the geo-location database 200 with these emission characteristics (unless it has queried with all options already), and provides new operating parameters to slave WSD2. Because slave WSD2 has better emission characteristics than slave WSD3, it may be allowed to use higher output power or wider bandwidth.

FIG. 8B shows a sequence of events at consecutive times T1 through T13 in database-centric method. In the beginning, before time T1, no slaves are connected.

At time T1, the master WSD1 sends a query to the geo-location database 200 to obtain allowed operating parameters for master WSD1, slave WSD2, and slave WSD3. The query uses the worst emission characteristics.

At time T2, the geo-location database 200 to transmits the allowed operating parameters to the master WSD1 for master WSD1, slave WSD2, and slave WSD3.

At time T3, the master WSD1, slave WSD2 and slave WSD3 create connections using allowed operating parameters "Y" transmitted by the master WSD1 in beacons to the slave WSD2 and slave WSD3.

At time T4, slave WSD2 determines that it is capable of better emission characteristics.

At time T5, slave WSD2 transmits its better emission characteristics to the master WSD1.

At time T6, the master WSD1 determines that both the master WSD1 and the slave WSD2 are capable of the same better emission characteristics.

At time T7, the master WSD1 sends another query to the geo-location database 200 to obtain new allowed operating parameters for master WSD1 and slave WSD2 based on the better emission characteristics that will be within the maximum allowed emission levels.

At time T8, the geo-location database 200 transmits to the master WSD1, new allowed operating parameters for master WSD1 and slave WSD2.

At time T9, the master WSD1 transmits the new operating parameters "X" to the slave WSD2.

At time T10, the master WSD1, slave WSD2 and slave WSD3 engage in user data exchange using the allowed operating parameters.

At time T11, the master WSD1 determines that there is a need to change the operating frequency and/or emission levels, for example due to new information received from the geo-location database 200, or due detected interference due the other users of the spectrum.

At time T12, the master device WSD1 transmits new operating parameters "T" to slave WSD2.

At time T13, the master device WSD1 transmits new operating parameters "V" to slave WSD3.

FIG. 9 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard), for storing data and/or computer program code as an example computer program product, in accordance with at least one embodiment of the present invention.

In an example embodiment of the invention, a master WSD may use pre-established logical channels to announce allowed emission levels to a WSD slave. The geo-location database 200 may send to a master WSD, maximum allowed emission levels. The master WSD may forward these maximum allowed emission levels with its own effective isotropic radiated power (EIRP) value in a pre-established logical channel or channels that it currently supports. When a potential slave WSD receives the maximum allowed emission levels, it may determine that is it able to communicate with the master WSD over any of the channels the master supports. The slave WSD may make this determination by calculating whether it is able to transmit a combination of output power and bandwidth that is within the prescribed maximum allowed emission levels, based on its emission characteristics as a function of output power and/or tunable emission characteristics. The slave WSD may then start an association process with the master WSD. Alternately, if the slave WSD determines that it is not able to communicate with the master WSD over any of the channels the master supports, then the slave WSD may remain silent. Later on, if the slave WSD wishes to make a connection with another slave WSD, it may use other available channels, if its own output power and/or tunable emission characteristics for this link are within the prescribed maximum allowed emission levels.

In an example embodiment of the invention, a master WSD and a slave WSD may not be associated. The master WSD may have received allowed emission levels from the geo-location database 200. The WSD master may define its operating parameters, maintained within the limits of the allowed emission levels when using its emission characteristics. Based on the allowed emission levels and the emission characteristics of the master WSD, the master WSD may define its operating parameters for a channel in use. The master WSD sends a beacon message to possible slave WSD devices for association with the master WSD. The beacon message may include at least information about the master WSD relating to its transmission power and its emission characteristics. Alternately, the beacon message may include the allowed emission levels received from the geo-location database 200. A slave WSD that may wish to associate with the master WSD, may define its transmission power for association, based on the information received in the beacon message and on its own available white space emission characteristics. After association, the slave WSD may request the final operating parameters from the master WSD.

Example embodiments of the invention include an apparatus, comprising means for receiving, in a first white space device, information relating to allowed emission levels in a white space radio system;

means for receiving by the first white space device, information relating to emission characteristics of a second white space device or at least one slave white space device, received from the second white space device;

means for computing by the first white space device, one or more allowed operating parameters for the second white space device or the at least one slave white space device, based on the received information relating to allowed emission levels and the received emission characteristics; and means for transmitting at least one of the allowed operating parameters to the second white space device.

Example embodiments of the invention include an apparatus, comprising means for receiving, by a slave white space device, one or more initial operating parameters calculated at least partly based on allowed emission levels for the slave white space device and minimum emission characteristics, received from a master white space device;

means for transmitting, by the white space device, information relating to emission characteristics of the slave white space device using the initial operating parameters; and means for receiving by the slave white space device, one or more allowed operating parameters calculated at least partly based on the emission characteristics of the slave white space device.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, phone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

The invention claimed is:

1. A method, comprising:

receiving, in a first white space device, information relating to allowed emission levels in a white space radio system;

receiving by the first white space device, information relating to emission characteristics of at least one slave white space device, received from the slave white space device;

computing by the first white space device, one or more allowed operating parameters for the at least one slave white space device, based on the received information relating to allowed emission levels and the received emission characteristics, the one or more allowed operating parameters representing a fractional portion of the allowed emission levels;

transmitting at least one of the allowed operating parameters to the slave white space device;

receiving, by the first white space device, from the at least one slave white space device, a request for modified operating parameters based on new information relating to new emission characteristics of the at least one slave white space device, the requested modified operating parameters representing emission levels having a greater power and/or less bandwidth, of which the slave white space device is capable, than that represented by the one or more allowed operating parameters;

computing by the first white space device, one or more modified allowed operating parameters for the at least one slave white space device, based on the received information relating to allowed emission levels and the new information relating to the new emission characteristics of the at least one slave white space device, the modified allowed operating parameters representing emission levels having a greater power and/or less bandwidth, of which the slave white space device is capable, than that represented by the one or more allowed operating parameters; and transmitting at least one of the modified allowed operating parameters to the at least one slave white space device.

2. The method of claim 1, further comprising:
wherein the first white space device comprises a master white space device and the slave white space device comprises the at least one slave white space device.

3. The method of claim 1, further comprising:
wherein the first white space device comprises a geo-location database and the slave white space device comprises a master white space device.

4. The method of claim 2, further comprising:
wherein the at least one slave white space device is associated with the master white space device.

5. The method of claim 2, further comprising:
transmitting a beacon message to the slave white space device, including at least one of information about the master white space device, information relating to the allowed emission levels in the white space radio system, initial operating parameters, emission characteristics of the master white space device, minimum allowed emission characteristics to define the initial operating parameters.

6. The method of claim 2, further comprising:
wherein minimum allowed emission characteristics are received from a geo-location database; and
initially communicating by the master white space device with the at least one slave white space device using the minimum allowed emission characteristics.

7. An apparatus, comprising:
at least one processor;
at least one memory including computer program code;
the at least one memory and the computer program code configured to, with the at least one processor, cause the apparatus at least to:
receive information relating to allowed emission levels in a white space radio system;
receive information relating to emission characteristics of a white space device or at least one slave white space device;
compute one or more allowed operating parameters for the white space device or the at least one slave white space device, based on the received information relating to allowed emission levels and the received emission characteristics of the white space device or the at least one slave white space device, the one or more allowed operating parameters representing a fractional portion of the allowed emission levels;
transmit at least one of the allowed operating parameters to the white space device;
receive from the at least one slave white space device, a request for modified operating parameters based on new information relating to new emission characteristics of the at least one slave white space device, the requested modified operating parameters representing emission levels having a greater power and/or less bandwidth, of which the slave white space device is capable, than that represented by the one or more allowed operating parameters;

compute one or more modified allowed operating parameters for the at least one slave white space device, based on the received information relating to allowed emission levels and the new information relating to the new emission characteristics of the at least one slave white space device, the modified allowed operating parameters representing emission levels having a greater power and/or less bandwidth, of which the slave white space device is capable, than that represented by the one or more allowed operating parameters; and transmit at least one of the modified allowed operating parameters to the at least one slave white space device.

8. The apparatus of claim 7, further comprising:
wherein the apparatus comprises a master white space device and the white space device comprises the at least one slave white space devices.

9. The apparatus of claim 7, further comprising:
wherein the apparatus comprises a geo-location database and the white space device comprises a master white space device.

10. The apparatus of claim 8, further comprising:
wherein the at least one slave white space device is associated with the master white space device.

11. The apparatus of claim 7, further comprising:
the at least one memory and the computer program code configured to, with the at least one processor, cause the apparatus at least to:
transmit in a beacon message to the slave white space device, including at least one of information about the master white space device, information relating to the allowed emission levels in the white space radio system, initial operating parameters, emission characteristics of the apparatus, minimum allowed emission characteristics to define the initial operating parameters.

12. The apparatus of claim 8, further comprising:
wherein minimum allowed emission characteristics are received from a geo-location database; and wherein the at least one memory and the computer program code are configured to, with the at least one processor, cause the apparatus at least to:
initially communicate with the at least one slave white space device, using the minimum allowed emission characteristics.

13. A method, comprising:
receiving, by a slave white space device, one or more initial operating parameters calculated at least partly based on allowed emission levels for the slave white space device and minimum emission characteristics, received from a master white space device;
transmitting, by the slave white space device, information relating to emission characteristics of the slave white space device using the initial operating parameters;
receiving by the slave white space device, one or more allowed operating parameters calculated at least partly based on the emission characteristics of the slave white space device the one or more allowed operating parameters representing a fractional portion of the allowed emission levels;
transmitting, by the slave white space device, to the master white space device, a request for modified operating parameters based on new information relating to new emission characteristics of the slave white space device, the requested modified operating parameters representing emission levels having a greater power and/or less bandwidth, of which the slave white space device is capable, than that represented by the one or more allowed operating parameters; and receiving, by the slave white space device, from the master white space device, at least one modified allowed operating parameter for the slave white space device, based on the allowed emission levels and the new information relating to the new emission characteristics of the slave white space device, the modified allowed operating parameter representing emission levels having a greater power and/or less bandwidth, of which the slave white space device is capable, than that represented by the one or more allowed operating parameters.

14. The method of claim 13, further comprising:
wherein the slave white space device is associated with the master white space device.

15. The method of claim 13, further comprising:
receiving a beacon message from the master white space device, including at least one of information about the master white space device, information relating to the allowed emission levels, the one or more initial operating parameters, or the minimum emission characteristics.

16. The method of claim 13, further comprising:
wherein the slave white space device is associated with the master white space device, and the information relating to the emission characteristics of the slave white space device is sent to the master white space device;
the method further comprising:
communicating with the master white space device using the received allowed operating parameters.

17. The method of claim 13, further comprising:
wherein the emission characteristics of the slave white space device are determined based on one or more operating parameters of the slave white space device.

18. The method of claim 17, further comprising:
wherein the one or more operating parameters comprise at least one of transmit power and transmit frequency.

19. An apparatus, comprising:
at least one processor;
at least one memory including computer program code;
the at least one memory and the computer program code configured to, with the at least one processor, cause the apparatus at least to:
receive one or more initial operating parameters calculated at least partly based on allowed emission levels for the apparatus and minimum emission characteristics, received from a master white space device;
transmit information relating to emission characteristics of the apparatus using the initial operating parameters, transmitted to master white space device;
receive one or more allowed operating parameters calculated at least partly based on the emission characteristics of the apparatus, received from the master white space device, the one or more allowed operating parameters representing a fractional portion of the allowed emission levels;
transmit to the master white space device, a request for modified operating parameters based on new information relating to new emission characteristics of the apparatus, the requested modified operating parameters representing emission levels having a greater power and/or less bandwidth, of which the apparatus is capable, than that represented by the one or more allowed operating parameters; and receive from the master white space device, at least one modified allowed operating parameter for the apparatus, based on the allowed emission levels and the new information relating to the new emission characteristics of the apparatus, the modified allowed operating parameter representing emission levels having a greater power and/or less bandwidth, of which the apparatus is capable, than that represented by the one or more allowed operating parameter.

20. The apparatus of claim 19, further comprising:
wherein the apparatus is associated with a master white space device, and the information relating to the emission characteristics of the apparatus is sent to the master white space device;
the at least one memory and the computer program code further configured to:
communicate with the master white space device using the received allowed operating parameters.

21. The apparatus of claim 19, further comprising:
wherein the emission characteristics of the apparatus are determined based on one or more operating parameters of the apparatus.

22. The apparatus of claim 19, further comprising:
wherein the one or more operating parameters comprise at least one of transmit power or transmit frequency.

23. A computer program product comprising computer executable program code recorded on a computer readable, non-transitory storage medium, the computer executable program code comprising:
code for receiving, in a first white space device, information relating to allowed emission levels in a white space radio system;
code for receiving by the first white space device, information relating to emission characteristics of at least one slave white space device, received from the slave white space device;
code for computing by the first white space device, one or more allowed operating parameters for the at least one slave white space device, based on the received information relating to allowed emission levels and the received emission characteristics, the one or more allowed operating parameters representing a fractional portion of the allowed emission levels;
code for transmitting the allowed operating parameters to the slave white space device;
code for receiving, by the first white space device, from the at least one slave white space device, a request for modified operating parameters based on new information relating to new emission characteristics of the at least one slave white space device, the requested modified operating parameters representing emission levels having a greater power and/or less bandwidth, of which the slave white space device is capable, than that represented by the one or more allowed operating parameters;
code for computing by the first white space device, one or more modified allowed operating parameters for the at least one slave white space device, based on the received information relating to allowed emission levels and the new information relating to the new emission characteristics of the at least one slave white space device, the modified allowed operating parameters representing emission levels having a greater power and/or less bandwidth, of which the slave white space device is capable, than that represented by the one or more allowed operating parameters; and code for transmitting at least one of the modified allowed operating parameters to the at least one slave white space device.

24. A computer program product comprising computer executable program code recorded on a computer readable, non-transitory storage medium, the computer executable program code comprising:
  code for receiving, by a slave white space device, one or more initial operating parameters calculated at least partly based allowed emission levels for the slave white space device and minimum emission characteristics;
  code for transmitting information relating to emission characteristics of the slave white space device using the initial operating parameters;
  code for receiving one or more allowed operating parameters calculated at least partly based on the emission characteristics of the slave white space device, the one or more allowed operating parameters representing a fractional portion of the allowed emission levels;
  code for transmitting, by the slave white space device, to the master white space device, a request for modified operating parameters based on new information relating to new emission characteristics of the slave white space device, the requested modified operating parameters representing emission levels having a greater power and/or less bandwidth, of which the slave white space device is capable, than that represented by the one or more allowed operating parameters; and
  code for receiving, by the slave white space device, from the master white space device, at least one modified allowed operating parameter for the slave white space device, based on the allowed emission levels and the new information relating to the new emission characteristics of the slave white space device, the modified allowed operating parameter representing emission levels having a greater power and/or less bandwidth, of which the slave white space device is capable, than that represented by the one or more allowed operating parameters.

* * * * *